(12) United States Patent
Fujii et al.

(10) Patent No.: US 10,346,202 B2
(45) Date of Patent: Jul. 9, 2019

(54) TASK CIRCUMSTANCE PROCESSING DEVICE AND METHOD

(71) Applicant: FUJITSU LIMITED, Kawasaki-shi, Kanagawa (JP)

(72) Inventors: Masanao Fujii, Kawasaki (JP); Hiroyasu Fujiwara, Setagaya (JP); Takumi Takeno, Kawasaki (JP); Takao Sekiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 15/441,679

(22) Filed: Feb. 24, 2017

(65) Prior Publication Data
US 2017/0286160 A1  Oct. 5, 2017

(30) Foreign Application Priority Data

Mar. 30, 2016 (JP) .................... 2016-068526

(51) Int. Cl.
*G06F 9/48* (2006.01)
*G06Q 30/02* (2012.01)
(Continued)

(52) U.S. Cl.
CPC ............ *G06F 9/4881* (2013.01); *G06F 9/46* (2013.01); *G06F 11/00* (2013.01); *G06F 11/22* (2013.01);
(Continued)

(58) Field of Classification Search
CPC .... G06Q 30/00; G06Q 30/02; G06Q 30/0201; G06Q 30/0204; G06Q 30/0205;
(Continued)

(56) References Cited

U.S. PATENT DOCUMENTS

| 7,023,469 B1* | 4/2006 | Olson | G08B 13/196 |
|---|---|---|---|
| | | | 348/143 |
| 2004/0027242 A1* | 2/2004 | Venetianer | G06K 9/00778 |
| | | | 340/555 |

(Continued)

FOREIGN PATENT DOCUMENTS

JP  2008-47110 A  2/2008

OTHER PUBLICATIONS

Extended European Search Report dated Jul. 31, 2017, issued in counterpart European Application No. 17156453.7. (7 pages).

(Continued)

*Primary Examiner* — Charles M Swift
(74) *Attorney, Agent, or Firm* — Westerman, Hattori, Daniels & Adrian, LLP

(57) ABSTRACT

A task circumstance processing system includes a processor that executes a process. The process includes: referencing a recognition information stored in a memory, the recognition information stores, for each of plural task processes in task definitions defining relationships between the plural task processes, recognition information for recognizing execution of each of the plural task processes, and extracting for each of the task processes a timing where the recognition information is expressed in observation data from observing circumstances of the task; and outputting a result of comparing a relationship between plural task processes that have been executed as identified by the extracted timings, against a relationship between plural task processes defined by the task definitions stored in the memory.

18 Claims, 28 Drawing Sheets

(51) Int. Cl.
| | |
|---|---|
| *G06F 11/00* | (2006.01) |
| *G06T 7/20* | (2017.01) |
| *G08B 13/196* | (2006.01) |
| *G06F 11/22* | (2006.01) |
| *G06Q 30/00* | (2012.01) |
| *G06F 9/46* | (2006.01) |
| *G06K 9/00* | (2006.01) |
| *G06F 11/30* | (2006.01) |
| *G06F 11/34* | (2006.01) |

(52) U.S. Cl.
CPC ...... *G06F 11/3024* (2013.01); *G06F 11/3419* (2013.01); *G06K 9/00335* (2013.01); *G06K 9/00342* (2013.01); *G06K 9/00711* (2013.01); *G06K 9/00771* (2013.01); *G06K 9/00993* (2013.01); *G06Q 30/00* (2013.01); *G06Q 30/02* (2013.01); *G06Q 30/0201* (2013.01); *G06Q 30/0204* (2013.01); *G06Q 30/0205* (2013.01); *G06Q 30/0241* (2013.01); *G06Q 30/0244* (2013.01); *G06Q 30/0246* (2013.01); *G06T 7/20* (2013.01); *G08B 13/196* (2013.01); *G08B 13/19602* (2013.01); *G08B 13/19604* (2013.01); *G08B 13/19606* (2013.01); *G08B 13/19613* (2013.01); *G08B 13/19615* (2013.01)

(58) Field of Classification Search
CPC ........... G06Q 30/0241; G06Q 30/0244; G06Q 30/0246; G06F 11/00; G06F 11/22; G06F 9/46; G06K 9/00335; G06K 9/00342; G06K 9/00771; G06T 7/20; G08B 13/196; G08B 13/19602; G08B 13/19604; G08B 13/19606; G08B 13/19613; G08B 13/19615
See application file for complete search history.

(56) References Cited

U.S. PATENT DOCUMENTS

| | | | |
|---|---|---|---|
| 2006/0204036 A1* | 9/2006 | Huang | G06K 9/00624 382/103 |
| 2008/0114581 A1* | 5/2008 | Meir | H04L 12/66 703/13 |
| 2008/0122926 A1 | 5/2008 | Zhou et al. | |
| 2011/0154367 A1* | 6/2011 | Gutjahr | G06F 9/542 719/316 |
| 2012/0022902 A1* | 1/2012 | Gressel | G06Q 10/02 705/5 |
| 2013/0159787 A1* | 6/2013 | Yingling, Jr. | G06F 11/008 714/47.3 |
| 2014/0025998 A1* | 1/2014 | Schimmelpfeng | G06F 11/079 714/39 |
| 2014/0279764 A1* | 9/2014 | Lahr | G06F 9/5038 706/12 |
| 2015/0049113 A1* | 2/2015 | Rahman | G06F 17/30277 345/633 |
| 2015/0248754 A1* | 9/2015 | Graner | G06K 9/00771 382/103 |
| 2016/0189078 A1* | 6/2016 | Gajdzinski | G06Q 10/06375 705/7.37 |
| 2016/0224837 A1* | 8/2016 | Lipert | G06K 9/00288 |
| 2017/0213234 A1* | 7/2017 | Ahuja | G06F 3/04842 |

OTHER PUBLICATIONS

Office Action dated Aug. 7, 2018, issued in counterpart European Application No. 17156453.7. (9 pages).

* cited by examiner

FIG.2

| DATE | INSPECTOR ID |
|---|---|
| 3/1 | 001 |
| 3/2 | 002 |
| 3/3 | 001 |
| 3/4 | 003 |
| ... | |

| NO. | TASK DEFINITIONS | | | CORRESPONDING ITEM |
|---|---|---|---|---|
| | DEFINITION ITEM | CALCULATION METHOD | CONDITION | |
| 1 | INSPECTION ORDER OF INSTALLATION A | | (Time (A) < Time (B)) AND (Time (A) < Time (C)) | A |
| 2 | INSPECTION ORDER OF INSTALLATION B | | (Time (B) < Time (C)) AND (Time (B) > Time (A)) | B |
| 3 | INSPECTION ORDER OF INSTALLATION C | | (Time (C) > Time (A)) AND (Time (C) > Time (B)) | C |
| 4 | OVERALL INSPECTION TIME | T = Time (end) − Time (start) | T < 10 MINUTES | START |

| | | 126 |
|---|---|---|
| INSPECTION OF INSTALLATION A | A | PATTERN a |
| INSPECTION OF INSTALLATION B | B | PATTERN b |
| INSPECTION OF INSTALLATION C | C | PATTERN c |
| INSPECTION START | START | PATTERN S |
| INSPECTION END | END | PATTERN E |

FIG.5

| DATE | TIME | ITEM | 127 |
|---|---|---|---|
| 3/1 | 9:00 | START | |
| 3/1 | 9:01 | A | |
| 3/1 | 9:05 | C | |
| 3/1 | 9:11 | B | |
| 3/1 | 9:15 | END | |
| ... | | | |

FIG.6

| DATE | INSPECTOR ID | INSPECTION ORDER | | | | OPERATION TIME (NO. 4) |
|---|---|---|---|---|---|---|
| | | INSTALLATION A (NO. 1) | INSTALLATION B (NO. 2) | INSTALLATION C (NO. 3) | | |
| 3/1 | 001 | OK | 1 | BAD | 3 | BAD | 2 | BAD | 15 MINUTES |
| 3/2 | 002 | OK | 1 | OK | 2 | OK | 3 | OK | 9 MINUTES |
| 3/3 | 001 | OK | 1 | BAD | 3 | BAD | 2 | BAD | 17 MINUTES |
| 3/4 | 003 | OK | 1 | OK | 2 | OK | 3 | BAD | 12 MINUTES |

| TIME | OPERATION | USER ID | TERMINAL ID |
|---|---|---|---|
| 8:50 | LOG-ON | 002 | 5 |
| 9:20 | LOG-ON | 003 | 6 |
| | ... | | |
| 17:00 | LOG-OFF | 002 | 5 |
| | ... | | |

| NO | TASK DEFINITION | | | 225 |
|----|---|---|---|---|
| | DEFINITION ITEM | CALCULATION METHOD | CONDITION | |
| 1 | LICENSE RESERVATION TIME | TIME (RELEASE) − TIME (ACQUISITION) | | |
| 2 | OPERATION TIME | T = Σ (Time (getting up) − Time (sitting down)) <br> + (Time (getting up) − Time (acquisition)) <br> + (Time (release) − Time (sitting down)) | T > 0.7 × NO.1 | |

| TERMINAL ID | IMAGE ID |
|---|---|
| 5 | G |
| 6 | H |
| 7 | I |

226A

| TASK PROCESS | | OPERATION |
|---|---|---|
| CONTENT | RECOGNITION RESULT | |
| CAD LICENSE ACQUISITION | ACQUISITION | LOG-ON |
| CAD LICENSE RELEASE | RELEASE | LOG-OFF |

226B

| TASK PROCESS | | IMAGE PATTERN |
|---|---|---|
| CONTENT | RECOGNITION RESULT | |
| SITTING DOWN AT INFORMATION PROCESSING TERMINAL | SITTING DOWN | PATTERN X |
| GETTING UP FROM INFORMATION PROCESSING TERMINAL | GETTING UP | PATTERN Y |

| INDEX OF IMAGE DATA (G) | |
|---|---|
| TIME | ITEM |
| 8:50 | ACQUISITION |
| 10:32 | GETTING UP |
| 10:45 | SITTING DOWN |
| 15:08 | GETTING UP |
| ... | |
| 17:00 | RELEASE |
| ... | |

FIG.18

| TERMINAL ID | USER ID | LOG-ON TIME | LOG-OFF TIME | OPERATION RATIO | DETERMINATION |
|---|---|---|---|---|---|
| 5 | 002 | 8:50 | 17:00 | 72% | OK |
| 6 | 003 | 9:20 | 15:00 | 75% | OK |
|   | 005 | 15:30 | 18:30 |   |   |
| 7 | 001 | 8:30 | 18:40 | 48% | NG |
| 8 | 004 | 10:00 | 17:10 | 86% | OK |

TERMINAL ID: 7
USER ID: USER 1
LOG-ON: 8:30
LOG-OFF: 18:40

| ITEM | TIME |
|---|---|
| ACQUISITION | 8:30 |
| GETTING UP | 10:00 |
| SITTING DOWN | 13:00 |
| GETTING UP | 15:08 |
| SITTING DOWN | 17:24 |
| RELEASE | 18:40 |

| TIME | INSTALLATION ID | RUNNING STATE |
|---|---|---|
| 9:05 | 10 | START |
| 9:18 | 16 | STOP |
| 9:27 | 19 | START |
| 9:40 | 10 | STOP |
| ... | | |

FIG.25

| NO | TASK DEFINITION | | |
|---|---|---|---|
| | DEFINITION ITEM | CALCULATION METHOD | CONDITION |
| 1 | OPERATOR WAITING TIME | T = Time (arrival) − Time (stop) | T < 5 MINUTES |

| OPERATOR ID | IMAGE ID |
|---|---|
| 002 | A |
| 005 | B |
| 006 | C |
| 009 | D |

326C

| TASK PROCESS | | IMAGE PATTERN |
|---|---|---|
| CONTENT | RECOGNITION RESULT CANDIDATE | |
| ARRIVAL OR STAYING AT PRODUCTION INSTALLATION 10 | 10 | e |
| ARRIVAL OR STAYING AT PRODUCTION INSTALLATION 14 | 14 | f |
| ARRIVAL OR STAYING AT PRODUCTION INSTALLATION 16 | 16 | g |
| ARRIVAL OR STAYING AT PRODUCTION INSTALLATION 19 | 19 | h |

326D

| RECOGNITION RESULT | CONDITION |
|---|---|
| ARRIVAL | DIFFERENT FROM IMAGE PATTERN EXTRACTED IMMEDIATELY PREVIOUSLY |
| STAYING | SAME AS IMAGE PATTERN EXTRACTED IMMEDIATELY PREVIOUSLY |

INDEX OF IMAGE DATA (B)
INDEX OF IMAGE DATA (C)

INDEX OF IMAGE DATA (D)

| TIME | INSTALLATION ID | ITEM |
|---|---|---|
| 9:10 | 19 | ARRIVAL |
| 9:24 | 19 | STAYING |
| 9:55 | 10 | ARRIVAL |
| 10:07 | 16 | ARRIVAL |
| 10:25 | 14 | ARRIVAL |
| ... | | |

| INSTALLATION ID | TIME | OPERATOR ID | WAITING TIME | DETERMINATION |
|---|---|---|---|---|
| 19 | 9:22 | 005 | 2 MINUTES | OK |
| 10 | 9:55 | 009 | 15 MINUTES | BAD |
| ... | | | | |

FIG.29

| TIME | RUNNING STATE | OPERATOR ID | WAITING TIME | DETERMINATION |
|---|---|---|---|---|
| 9:05 | START | | | |
| 9:40 | STOP | | | |
| 9:55 | ARRIVAL | 009 | 15 MINUTES | BAD |
| 9:58 | START | | | |

| OPERATOR ID | INSTALLATION ID | ITEM | TIME |
|---|---|---|---|
| 009 | 19 | ARRIVAL | 9:10 |
| 009 | 19 | STAYING | 9:24 |
| 009 | 10 | ARRIVAL | 9:55 |
| 009 | 16 | ARRIVAL | 10:07 |
| 009 | 14 | ARRIVAL | 10:25 |

TASK CIRCUMSTANCE PROCESSING DEVICE AND METHOD

CROSS-REFERENCE TO RELATED APPLICATION

This application is based upon and claims the benefit of priority of the prior Japanese Patent Application No. 2016-068526, filed on Mar. 30, 2016, the entire contents of which are incorporated herein by reference.

FIELD

The embodiments discussed herein are related to a task circumstance processing system, a task circumstance processing method, and a storage medium storing a task circumstance processing program.

BACKGROUND

Hitherto, video recording technology capable of surveying business processes has been proposed. In such technology, a region of concern is defined within a field of vision of plural respective cameras that each have a defined field of vision, a background image is taken for the region of concern, and movement in the region of concern is detected by comparing each frame against the background image. The video recording is then segmented, and indexes are created based on the movement detection.

RELATED PATENT DOCUMENTS

Japanese Laid-Open Patent Publication No. 2008-47110

SUMMARY

According to an aspect of the embodiments, a task circumstance processing system includes a memory, and a processor coupled to the memory. The processor is configured to: reference a recognition information stored in the memory, the recognition information stores, for each of plural task processes in task definitions defining relationships between the plural task processes, recognition information for recognizing execution of each of the plural task processes, and extract for each of the task processes a timing where the recognition information is expressed in observation data from observing circumstances of the task; and output a result of comparing a relationship between plural task processes that have been executed as identified by the extracted timings, against a relationship between plural task processes defined by the task definitions stored in a task definition storage section.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of system data of the first exemplary embodiment;

FIG. 3 is a diagram illustrating an example of a task definition database (DB) of the first exemplary embodiment;

FIG. 4 is a diagram illustrating an example of a recognition information DB of the first exemplary embodiment;

FIG. 5 is a diagram illustrating an example of an index list of the first exemplary embodiment;

FIG. 6 is a diagram illustrating an example of an output screen of the first exemplary embodiment;

FIG. 15 is a diagram illustrating an example of a task definition DB of the second exemplary embodiment;

FIG. 16 is a diagram illustrating an example of a recognition information DB of the second exemplary embodiment;

FIG. 17 is a diagram illustrating an example of index lists of the second exemplary embodiment;

FIG. 18 is a diagram illustrating an example of an output screen of the second exemplary embodiment;

FIG. 25 is a diagram illustrating an example of a task definition DB of the third exemplary embodiment;

FIG. 26 is a diagram illustrating an example of a recognition information DB of the third exemplary embodiment;

FIG. 27 is a diagram illustrating an example of index lists of the third exemplary embodiment;

FIG. 28 is a diagram illustrating an example of a comparison result list of the third exemplary embodiment;

FIG. 29 is a diagram illustrating an example of an output screen of the third exemplary embodiment;

DESCRIPTION OF EMBODIMENTS

Detailed explanation follows regarding examples of exemplary embodiments according to technology disclosed herein, with reference to the drawings.

First Exemplary Embodiment

In the first exemplary embodiment, explanation follows regarding an example of a case in which circumstances of a task related to inspection of an installation are analyzed.

Figure 1:
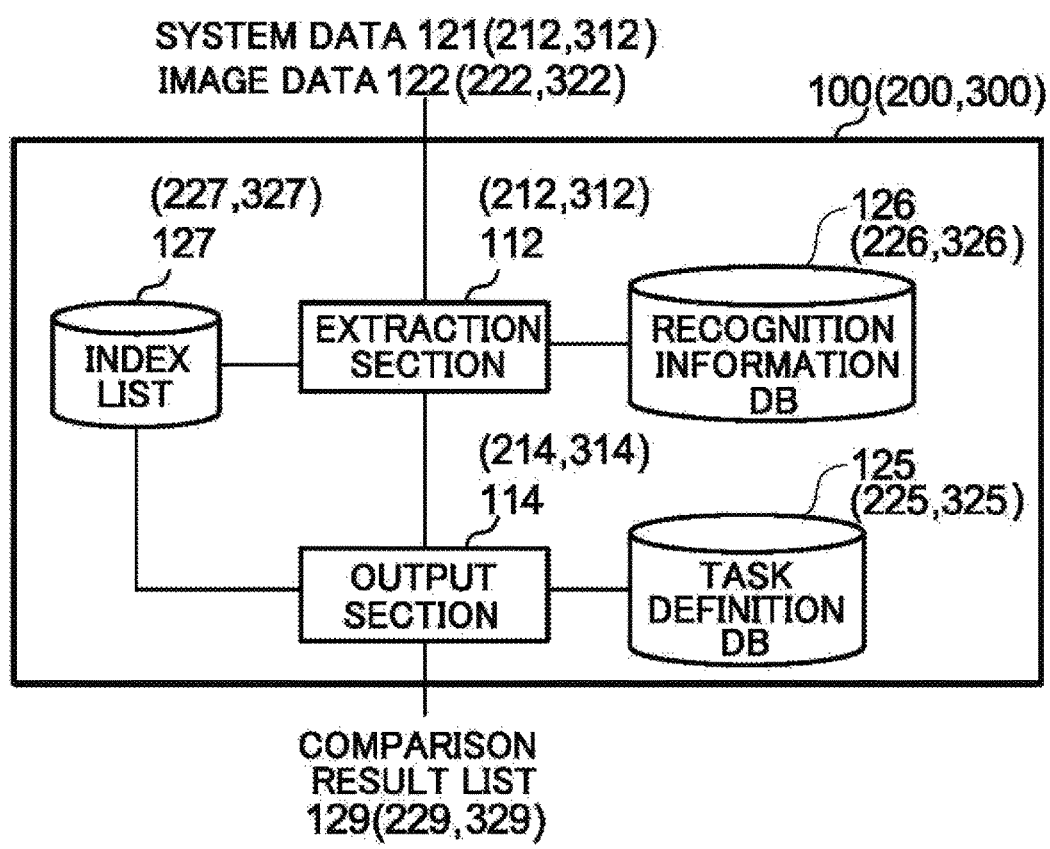
FIG. 1 is a functional block diagram illustrating a schematic configuration a task circumstance processing device according to a first to a third exemplary embodiment.

As illustrated in FIG. 1, a task circumstance processing device 100 according to the first exemplary embodiment compares task circumstances recognized from system data 121 and image data 122 against task definitions defined as proper forms of the task, and outputs a comparison result list 129.

The system data 121 is data that records and manages data in a task system employed when executing task processes. The system data 121 includes, for example, operation recordings input by an operator and log data recorded by the task system when the system runs. In the first exemplary embodiment, an inspector who performs tasks related to inspection of an installation registers an inspection recording in an inspection management system that is a task system. This registered information is input to a task circumstance processing device 100 as the system data 121. FIG. 2 illustrates an example of the system data 121 in the first exemplary embodiment. In the example of FIG. 2, the date on which the inspection was performed, and the inspector ID that is identification information for the inspector who performed the inspection, are associated with each other and registered as an inspection record.

The image data 122 is data, captured by a video camera or the like, imaging a state in which task being executed. The image data 122 is an example of observation data of technology disclosed herein. In the first exemplary embodiment, the image data 122 captured from a video camera worn on a specific location of the inspector (for example, the head) during a task related to inspection of the installation is input to the task circumstance processing device 100. The image data 122 includes plural frames arranged in a time series in order of capture, and time information is associated with each frame. The time information may be an actual date and time of capture, or may represent time elapsed when captured since a reference point of the image data 122 (for example, a recording start time). Here, explanation follows regarding an example of the former case.

The task circumstance processing device 100 functionally includes an extraction section 112 and an output section 114. A task definition database (DB) 125 and a recognition information DB 126 are stored in a specific storage region of the task circumstance processing device 100.

For each task, the task definition DB 125 stores corresponding task definitions defined by relationships between plural task processes included in the task. The relationship between task processes is, for example, an execution sequence for the respective task processes, a continuation time of an observed, identified state relating specific task processes to each other, or a time interval spanning from the end of a given task process until the start of the next task process. The task definition describes conditions to be met by one or plural definition items. The condition to be met by the definition item is a form that the task is to take, and is a correct procedure or a number serving as a target, expressed using a relationship between task processes such as those described above. Moreover, a calculation method for calculating values needed for determination of the conditions is expressed by the definition item using a relationship between task processes such as those described above.

The first exemplary embodiment gives an example in which a task related to inspection of installations includes the start of inspection, inspection of installation A, inspection of installation B, inspection of installation C, and the end of inspection, as the task processes. The task definitions of this task, for example, state that installation A, installation B, and installation C are inspected in this order, and that the overall time for the inspection is within 10 minutes. An example of the task definition DB 125 in this case is illustrated in FIG. 3. In the example of FIG. 3, the task definitions include definition items No. 1 to No. 4. No. 1 to No. 3 are definition items that stipulate an inspection order for the installations, and No. 4 is a definition item that stipulates an overall inspection time. Moreover, the "Time (X)" is time information regarding the frame in the image data 122 appended with an index (described in detail later) of item X.

Moreover, in the example of FIG. 3, a "corresponding item" employed when identifying the index from the definition item during output of a comparison result, described later, is included in the task definition DB 125.

An image pattern for recognizing from the image data 122 the place where the task process has been executed are stored in the recognition information DB 126 for each task process. The image pattern is, for example, a pattern expressing a predetermined QR code (registered trademark), text string, numeral, or the like, and a different image pattern is defined for each task process. Moreover, the image pattern is imaged by a video camera worn by the inspector when the inspector starts each task process. FIG. 4 illustrates an example of the recognition information DB 126 in the first exemplary embodiment. The "recognition result" of the task process is information indicating which image pattern was recognized in the image data 122, namely, which task process was executed. The "content" of the task process is an item conveniently describing the content of the task process to facilitate understanding of the explanation, and is not a required item in the recognition information DB 126.

The extraction section 112 extracts each image pattern stored in the recognition information DB 126 from each frame of the input image data 122 using image processing such as pattern matching. The extraction section 112 creates an index that associates time information regarding frames extracted by any image pattern, with the recognition result corresponding to the extracted image patterns. FIG. 5 illustrates an example of an index list 127 storing a time series of created indexes. In the example of FIG. 5, the "date" and "time" are time information of the frames, and the "item" is a recognition result corresponding to the image pattern extracted from the frame identified by the time information indicated by the "date" and "time". For example, the index of the second row of the index list 127 of FIG. 5 indicates that image pattern a was extracted from the frame identified by the date "3/1" and the time "9:01". Namely, it can be identified from the index list 127 that, in an inspection task of 3/1, the inspector arrived at installation A, an image pattern a affixed to the installation A was captured, and inspection of the installation A started at 9:01.

Based on the indexes created by the extraction section 112, the output section 114 identifies relationships between plural task processes included in the inspection task executed at a designated date, and compares the relationships against relationships between task processes defined in the task definition DB 125. More specifically, the output section 114 acquires, from the index list 127, time information employed by the calculation method and condition of each definition item defined in the task definition DB 125. In cases in which a calculation method is stipulated by the definition item, the output section 114 employs time information acquired from the index list 127, and calculates values for that definition item according to the stipulated calculation method. In cases in which there is time information acquired from the index list 127 and a calculated value, the output section 114 then uses those values to determine whether or not the task circumstances meet the condition of each definition item. For example, the output section 114 appends a determination result "OK" to definition items meeting the conditions, and appends a determination result "BAD" to definition items not meeting the conditions.

For example, the date 3/1 is designated as the inspection task to be the target of comparison against task definitions. Moreover, as illustrated in FIG. 3, the condition stipulated by the definition item of No. 1 of the task definition DB 125 is "(Time (A)<Time (B)) AND (Time (A)<Time (C))". The output section 114 accordingly acquires, as the Time (A), the time "9:01" of the index for which the date is "3/1" and the item is "A" from the index list 127. Similarly, the output section 114 acquires Time (B)=9:11 and Time (C)=9:05. In such cases, the output section 114 associates the determination result "OK" with the definition item of No. 1 since the condition of the definition item of No. 1 is met.

In the case of the definition item of No. 4 of the task definition DB 125 illustrated in FIG. 3, the calculation method is "overall inspection time T=Time (end)−Time (start)". The output section 114 acquires Time (start)=9:00 and Time (end)=9:15 from the index list 127, and calculates that the overall inspection time T is 15 minutes. Since the condition of the definition item of No. 4 is "T<10 minutes", the output section 114 associates the determination result "BAD" with the definition item of No. 4.

The output section 114 acquires an inspector ID corresponding to the designated date from the system data 121, and stores, in the comparison result list 129, the designated date, the acquired inspector ID, and the associated comparison result of the comparison against the determination result of each definition item. Note that in addition to the determination result of each definition item, the output section 114 may include a value of a circumstance for each definition item.

Moreover, the output section 114 displays an output screen that includes the stored comparison result list 129 on a display device. FIG. 6 illustrates an example of an output screen 130. The comparison result list 129 and an image playback region 131 are included in the output screen 130. Note that although FIG. 6 is an example of the output screen 130, the data structure of the comparison result list 129 is as illustrated in FIG. 6. Each row of the comparison result list 129 corresponds to a comparison result corresponding to one inspection task.

When the determination result of any definition item included in any of the comparison results is selected from the comparison result list 129, the output section 114 identifies the item of the index corresponding to that definition item from the definition item corresponding to the selected determination results. The item of the index corresponding to the definition item can be identified by the "corresponding item" of the task definition DB 125. The output section 114 also identifies the date of the comparison result included in the selected determination result. The output section 114 then identifies the index that includes the item and date of the identified index from the index list 127. The output section 114 then plays back the corresponding image data 122 in the image playback region 131 from the place (frame) indicated by the time information of the identified index.

For example, as illustrated in FIG. 6, the determination result "BAD" of the definition item of No. 2 in the inspection task of 3/3 (the dashed portion in FIG. 6) has been selected. In this case, the image data 122 is played back from a scene capturing the task process for inspecting installation B, in the inspection task of 3/3. Note that in cases in which the determination result of the definition item of No. 4 has been selected, since the "corresponding item" for the definition item of No. 4 is "start", the image data 122 is played back from a place (frame) indicated by the time information of the index having the item "start".

Figure 7:
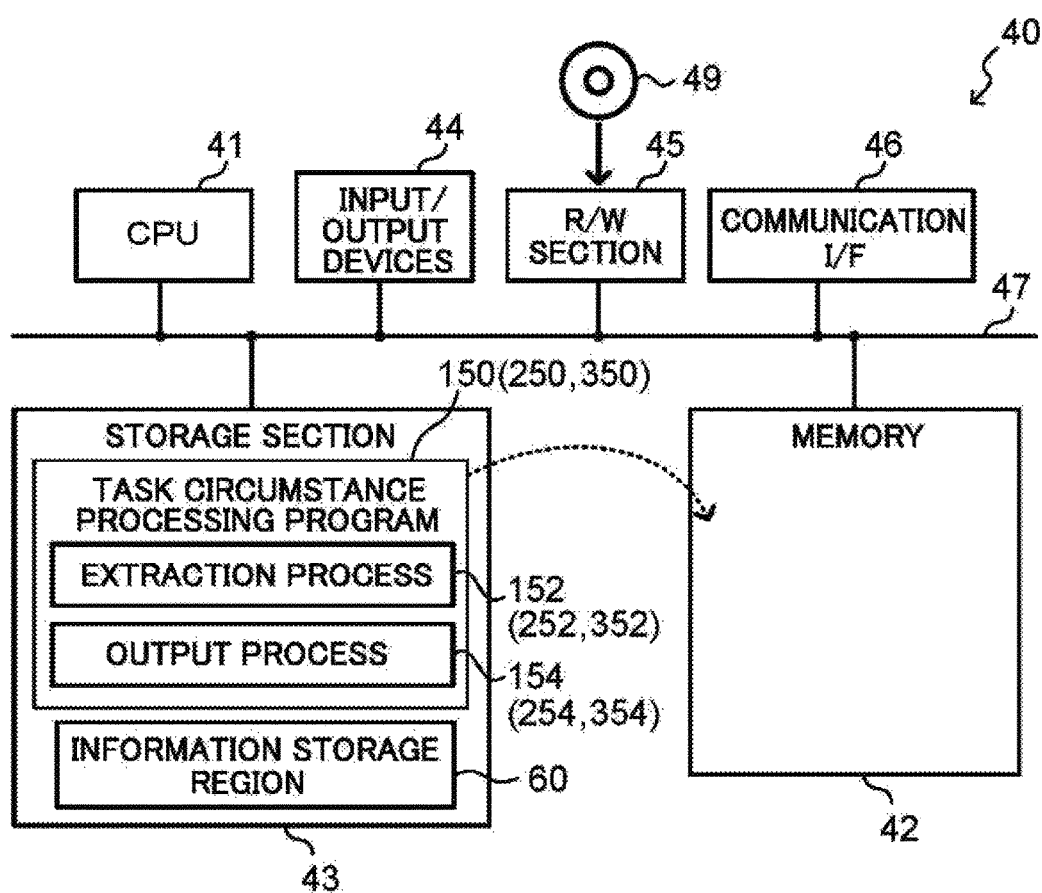
FIG. 7 is a block diagram illustrating a schematic configuration of a computer that functions as a task circumstance processing device according to the first to the third exemplary embodiments.

The task circumstance processing device 100 may, for example, be implemented by the computer 40 illustrated in FIG. 7. The computer 40 includes a CPU 41, memory 42 serving as a non-transient storage section, and a non-volatile storage region 43. The computer 40 further includes input/output devices 44 such as an input device and a display device, a read/write (R/W) section 45 that controls reading and writing of data from and to a recording medium 49, and a communication interface (I/F) 46. The CPU 41, the memory 42, the storage section 43, the input/output devices 44, the R/W section 45, and the communication I/F 46 are connected to one another through a bus 47.

The storage section 43 may be implemented by a hard disk drive (HDD), a solid state drive (SSD), flash memory, or the like. A task circumstance processing program 150 for causing the computer 40 to function as the task circumstance processing device 100 is stored in the storage section 43, which serves as a storage medium. The task circumstance processing program 150 includes an extraction process 152 and an output process 154. The storage section 43 further includes an information storage region 60 that stores information respectively forming the task definition DB 125, the recognition information DB 126, and the index list 127.

The CPU 41 reads the task circumstance processing program 150 from the storage section 43, expands the task circumstance processing program 150 into the memory 42, and sequentially executes the processes included in the task circumstance processing program 150. The CPU 41 operates as the extraction section 112 illustrated in FIG. 1 by executing the extraction process 152. The CPU 41 also operates as the output section 114 illustrated in FIG. 1 by executing the output process 154. The computer 40, which executes the task circumstance processing program 150, thereby functions as the task circumstance processing device 100.

Note that the functionality implemented by the task circumstance processing program 150 may be implemented by, for example, a semiconductor integrated circuit, and more specifically, by an application identified integrated circuit (ASIC) or the like.

Figure 8:
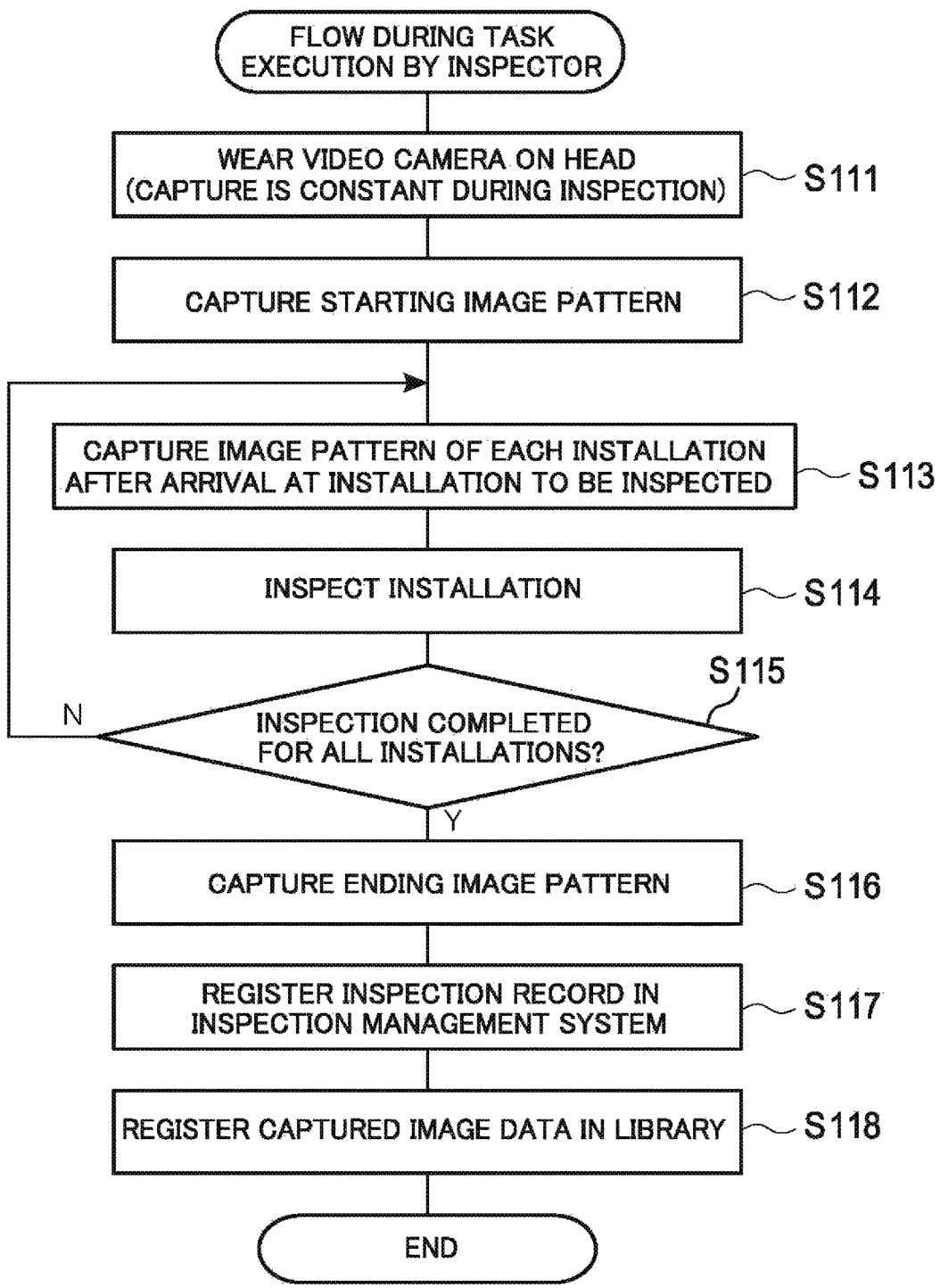
FIG. 8 is a flowchart flow illustrating an example of a procedure during task execution by an inspector of the first exemplary embodiment.

Next, explanation follows regarding operation of the task circumstance processing device 100 according to the first exemplary embodiment. First, prior to the task circumstance processing being executed by the task circumstance processing device 100, the state during actual task execution is observed. In the first exemplary embodiment, for example, due to the inspector executing the inspection, the image data 122 is obtained as the observation data by the procedure expressed by the flow of task execution by the inspector illustrated in FIG. 8. Detailed explanation follows regarding the flow of task execution by the inspector.

At step S111, the inspector wears the video camera on a specific location (for example, the head) of their own body such that the state of the inspection operation by the inspector is included in the image capture range, and starts image capture. Image capture by the video camera continues until the inspection task ends.

Next, at step S112, the inspector moves to a location where an image pattern indicating the start of the inspection task is affixed, and images that starting image pattern.

Next, at step S113, the inspector moves to an installation targeted for inspection, and images an image pattern affixed to that installation for identifying the installation when having arrived at the installation location of that installation. Then, at step S114, the inspector inspects the installation whose image pattern was imaged at step S113 above.

Next, at step S115, the inspector determines whether or not inspection of all of the installations targeted for inspection has completed, and moves to the next installation to perform inspection in cases in which an uninspected installation is present. Namely, the procedure of the step S113 and step S114 is repeated. When inspection is complete for all of the installations, at the next step S116, the inspector moves to the location where the image pattern indicating the end of inspection task is affixed, images the end image pattern, and stops image capture by the video camera.

Next, at step S117, the inspector registers the date on which the inspection was performed, and his own inspector ID, in the inspection management system as an inspection record. Moreover, at step S118, the image data 122 captured by the video camera is registered in a library that is a specific storage region of the inspection management system or another device, and the inspection task ends.

Figure 9:
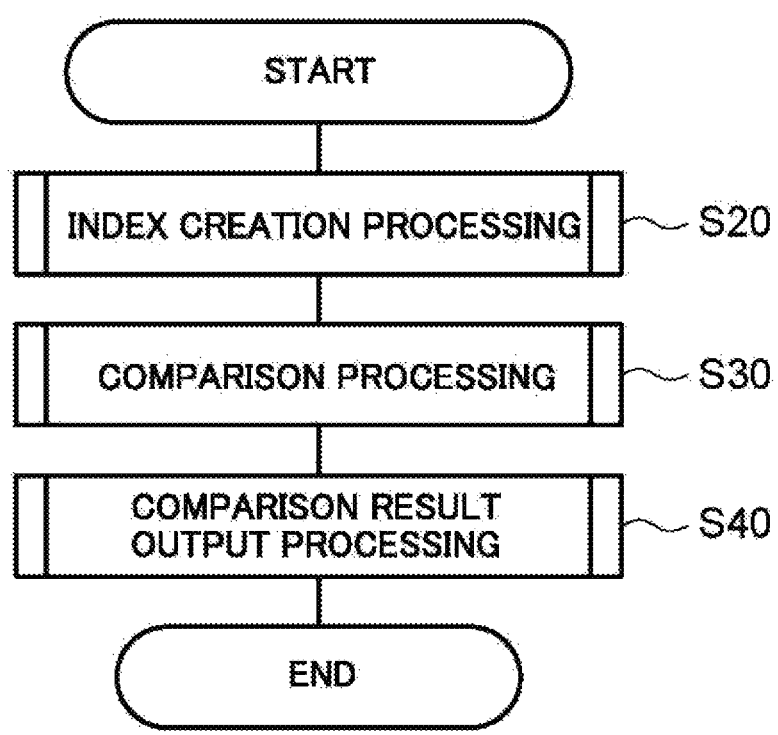
FIG. 9 is a flowchart illustrating an example of task circumstance processing of the first to the third exemplary embodiments.

Thus, the system data 121 accumulates in the inspection management system and the image data 122 accumulates in the library, due to the inspector executing the inspection task. Then, in the task circumstance processing device 100, when analysis of the task circumstance is instructed, the task circumstance processing illustrated in FIG. 9 is executed in the task circumstance processing device 100.

At step S20, the extraction section 112 executes index creation processing, described in detail later, to append indexes corresponding to the execution of task processes to the image data 122. Next, at step S30, the output section 114 compares the task circumstances against the task definitions by executing comparison processing, described in detail later. Next, at step S40, the output section 114 displays comparison results on the display device by executing comparison result output processing, described in detail later. Detailed description of each processing is given below.

Figure 10:
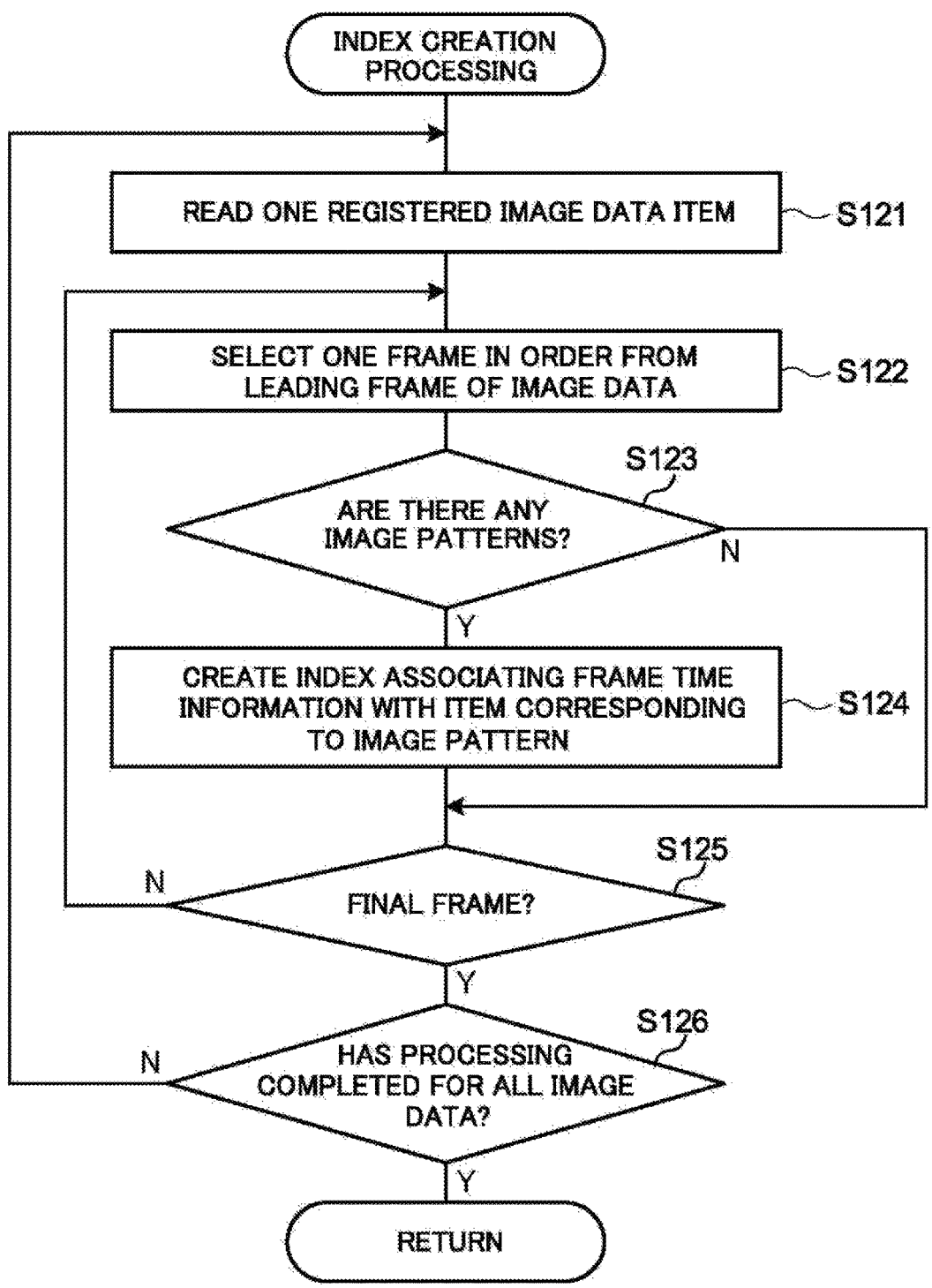
FIG. 10 is a flowchart illustrating an example of index creation processing of the first exemplary embodiment.

First, explanation follows regarding the index creation processing, with reference to FIG. 10.

At step S121, the extraction section 112 reads one item of the image data 122 registered in the specific library. Next, at step S122, the extraction section 112 selects one frame in order from the leading frame of the read image data 122.

Next, at step S123, the extraction section 112 determines whether or not an image pattern matching any image pattern stored in the recognition information DB 126 is included in the selected frame by image processing such as pattern matching. Processing transitions to step S124 in cases in which any image pattern is included. Processing transitions to step S125 in cases in which no image pattern is included.

At step S124, the extraction section 112 creates an index associating the time information regarding the frame selected at step S122 above with an item indicating a recognition result, found at step S123, corresponding to the image pattern determined as included in that frame. The extraction section 112 stores the created index in the index list 127.

Next, at step S125, the extraction section 112 determines whether or not the frame selected at step S122 is the final frame of the image data 122 read at step S121. Processing transitions to step S126 in cases in which the frame is the final frame, and in cases in which the frame is not the final frame, processing returns to step S122, and the extraction section 112 selects the next frame.

At step S126, the extraction section 112 determines whether or not the processing to create the indexes has completed for all of the image data 122 registered in the library. Processing returns to step S121 in cases in which unprocessed image data 122 is present, or in cases in which the processing has completed for all of the image data 122, the index creation processing ends and processing returns to the task circumstance processing (FIG. 9).

Figure 11:
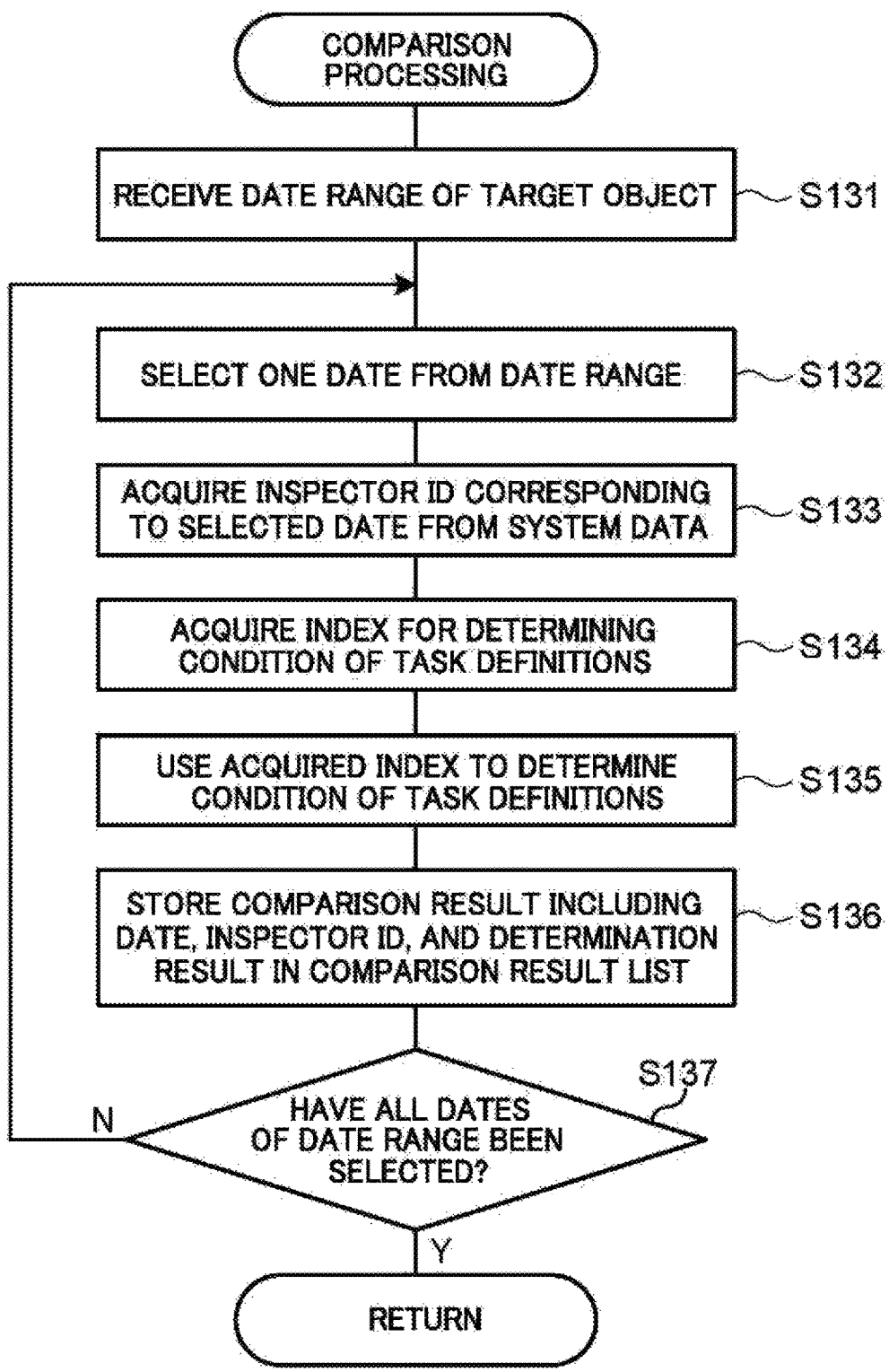
FIG. 11 is a flowchart illustrating an example of comparison processing of the first exemplary embodiment.

Next, explanation follows regarding the comparison processing, with reference to FIG. 11.

At step S131, the output section 114 receives designation of a date range for the performance date of the target inspection task in which the circumstances are compared to task definitions. Next, at step S132, the output section 114 selects one date from the designated date range.

Next, at step S133, the output section 114 acquires the inspector ID corresponding to the date selected at step S132 above from the system data 121.

Next, at step S134, the output section 114 acquires, from the index list 127, the indexes that include the time information to be employed to calculate a value in accordance with the calculation method stipulated for each definition item of the task definition DB 125, and determine the condition.

Next, at step S135, the output section 114 employs the time information of the acquired index to perform calculation of values in accordance with the calculation method stipulated for each definition item, and determination of the condition, and associates a determination result with each definition item.

Next, at step S136, the output section 114 stores, in the comparison result list 129, the date selected at step S132 above, the inspector ID acquired at step S133 above, and a comparison result associated with the determination result for each definition item obtained at step S135 above.

Next, at step S137, the output section 114 determines whether or not all of dates in the date range received at step S131 above have been selected at step S132 above. Processing returns to step S132 in cases in which dates that have not yet been selected are present, or in cases in which all of the dates have been selected, the comparison processing ends and processing returns to the task circumstance processing (FIG. 9).

Figure 12:
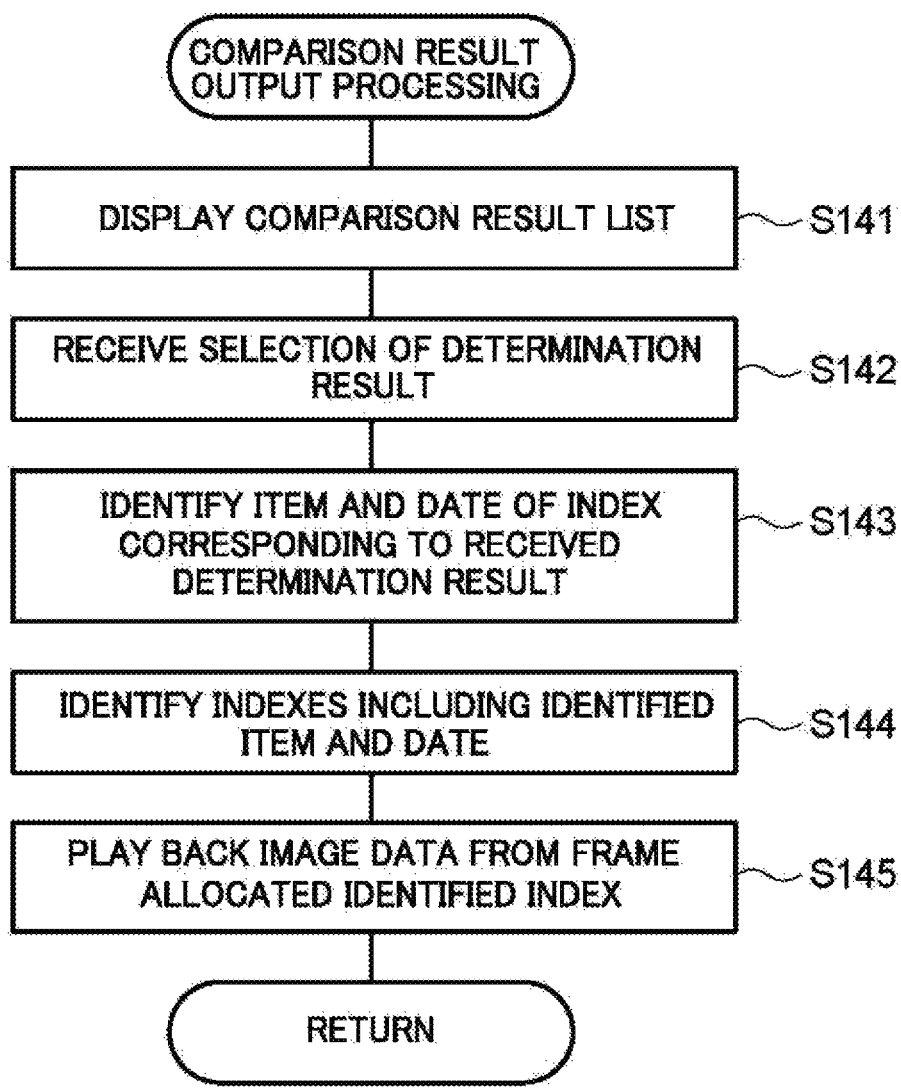
FIG. 12 is a flowchart illustrating an example of comparison result output processing of the first exemplary embodiment.

Next, explanation follows regarding comparison result output processing with reference to FIG. 12.

At step S141, the output section 114 displays the output screen including the stored comparison result list 129 on the display device.

Next, at step S142, the output section 114 receives a selection of a determination result of any definition item included in any comparison result.

Next, at step S143, based on the "corresponding item" of the task definition DB 125, the output section 114 identifies, from the definition item corresponding to the received determination result, the item of the index corresponding to that definition item. Moreover, the output section 114 identifies the date of the comparison result that includes the selected determination result.

Next, at step S144, the output section 114 identifies the index that includes the index item and the date identified at step S143 above, from the index list 127.

Next, at step S145, the output section 114 plays back the corresponding image data 122 on the image playback region 131, from the place (frame) indicated by the time information of the index identified at step S144 above. Then, the comparison result output processing ends and the task circumstance processing (FIG. 9) also ends.

As explained above, the task circumstance processing device 100 according to the first exemplary embodiment appends indexes to image data according to task definitions, uses the indexes appended to the image data to compare the task circumstances to the task definitions, and outputs the comparison results. Analysis of the task circumstances in comparison with the task definitions can thereby be assisted.

Figures 13, 14:
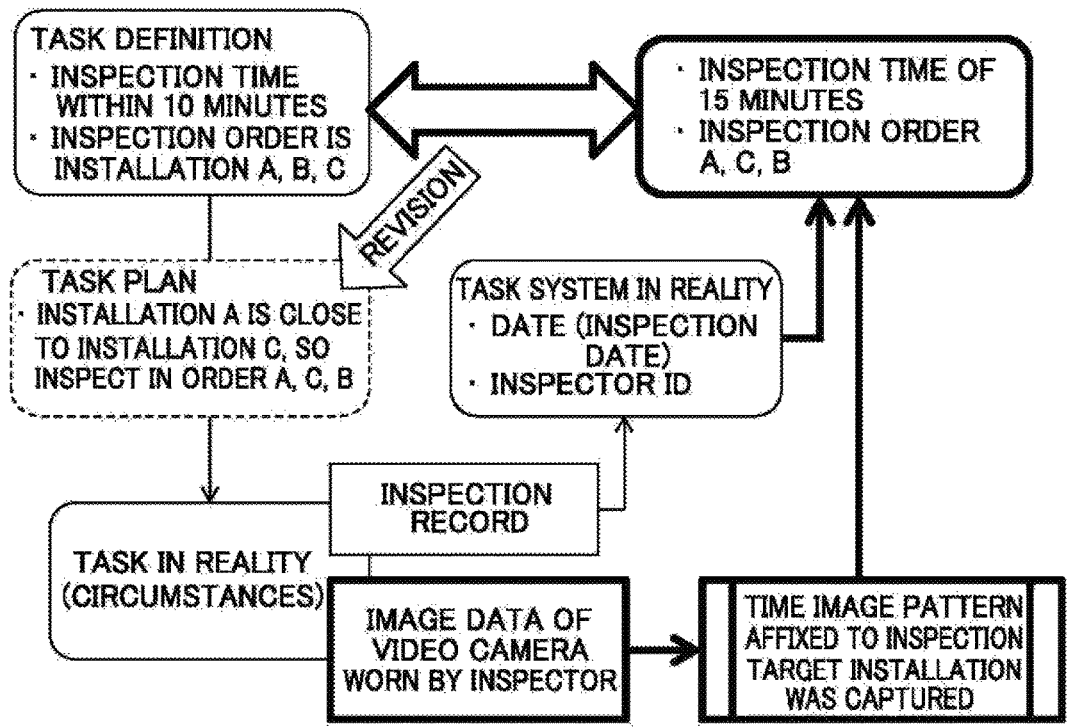
FIG. 13 is a schematic diagram illustrating an example of a comparison between circumstances of a task and task definitions in the first exemplary embodiment.
FIG. 14 is a diagram illustrating an example of system data of the second exemplary embodiment.

More specifically, FIG. 13 illustrates a schematic example of a comparison of the task circumstance against the task definition in inspection task serving as an example of the first exemplary embodiment. For example, that inspection in the order of installation A, installation B, and installation C is defined in the task definitions since the action timing does not match, giving rise to a waiting time, unless the inspection of installation B is after the inspection of the installation A. In the task definitions that follow, in the comparison result list 129 of the output screen 130 illustrated in FIG. 6, the operation times of the inspection task of 3/3 and the inspection task of 3/4 do not meet the condition defined by the task definitions. However, it is not determinable from the operation times alone whether the there is a problem with the inspection order or a problem with the method of the inspection operation at each installation.

In the first exemplary embodiment, displaying the determination results associated with the task definitions like on the output screen 130 illustrated in FIG. 6 enables selection of the determination result for which confirmation of details is desired, and enables the image data 122 of the corresponding place to be confirmed. For example, selecting the determination result "BAD" for the definition item for the inspection order of the installation B (the dashed portion in FIG. 6) and confirming the image data enables confirmation to be made that wasteful waiting time is occurring when not meeting the action timing of the installation B during inspection of the installation B. From such contents, as illustrated in FIG. 13, for example, since the distance between the installation locations of the installation A and the installation C is short, the inspection will be performed in order of the installation A, the installation C, and the installation B in some cases, and this enables task circumstances that suggest a case in which inspection time will be lengthened to be ascertained.

Second Exemplary Embodiment

In the second exemplary embodiment, explanation follows regarding an example of a case in which the circumstances of a task in which computer-aided design (CAD) is employed are analyzed. Note that in the second exemplary embodiment, configuration similar to configuration of the first exemplary embodiment is allocated reference numerals that share the same final two digits, and explanation focuses on portions that differ from the first exemplary embodiment.

As illustrated in FIG. 1, a task circumstance processing device 200 according to the second exemplary embodiment compares task circumstances recognized from system data 221 and image data 222 against task definitions, and outputs a comparison result list 229.

The system data 221 of the second exemplary embodiment is log data, recorded by the task system, of operations in an information processing terminal installed with CAD. FIG. 14 illustrates an example of system data 221 in the second exemplary embodiment. In the example of FIG. 14, each row (each record) is an operation log item for one operation. Each operation log item includes the time at which a log-on or log-off operation was performed, information indicating whether the performed operation was a log-on or a log-off, a user ID that is identification information for a CAD user, and information regarding a terminal ID or the like that is identification information of the operated information processing terminal.

The image data 222 in the second exemplary embodiment is image data captured by a video camera installed to a fixed position capable of recognizing the user sitting down at or getting up from the information processing terminal. For example, the video camera is installed on, for example, a display upper portion of the information processing terminal so as to image the user performing operations while facing the display.

The task circumstance processing device 200 functionally includes an extraction section 212 and an output section 214. Moreover, a task definition DB 225 and a recognition information DB 226 are stored in a specific storage region of the task circumstance processing device 200.

The task that employs CAD includes, as task processes, acquiring and releasing a CAD license, and a user sitting down at and getting up from the information processing terminal on which CAD is installed, as an example in the second exemplary embodiment. The task definitions of this task, for example, state that the operation ratio of CAD while the license is reserved is greater than 70%. The operation ratio is the proportion of time in which CAD is being used and is operation in a period spanning from when the CAD license is acquired to the CAD license being released, and is determination criteria when determining, for example, how many licenses are to be contracted.

In such cases, FIG. 15 illustrates an example of the task definition DB 225. In the example of FIG. 15, the task definitions include the definition items of No. 1 and 2. No. 1 is the definition item stipulating calculation of the time for which the CAD license is reserved, and No. 2 is a definition item stipulating an operation time by CAD. The first term in the calculation method is the total time between sitting down and getting up, the second term is the time from logging on to first getting up, and the third term is the time from sitting down for the last time and logging off. The condition "T>0.7×No. 1" of the definition item of No. 2 expresses a task definition stating that the operation ratio of CAD while the license is reserved is greater than 70%.

As illustrated in FIG. 16, a terminal image correspondence table 226A, an operation recognition table 226B, and an image pattern recognition table 226C are included in the recognition information DB 226 in the second exemplary embodiment.

The terminal image correspondence table 226A is a table indicating correspondence relationships indicating whether each image data 222 has captured the user sitting down at or getting up from any information processing terminal. The terminal ID of the information processing terminal and the image ID, which is identifying information of the image data 222, are associated and registered in the terminal image correspondence table 226A. The image ID may, for example, be information unique to the video camera that captured each image data 222.

An operation recognition table 226B stores, for each task process, operations for recognizing places where the task process was executed from the system data 221. Task processes recognized from the system data 221 are acquisition and release of the CAD license. The operation recognition table 226B of FIG. 16 indicates that acquisition of the license is recognized when logged on to the information processing terminal, and release of the license is recognized when logging off.

An image pattern recognition table 226C is similar to the recognition information DB 126 of the first exemplary embodiment, and in the second exemplary embodiment, patterns are stored for recognizing that the user has sat down at or gotten up from an information processing terminal by image processing.

Similarly to the extraction section 112 of the first exemplary embodiment, the extraction section 212 uses the image patterns stored in the image pattern recognition table 226C to create indexes. The extraction section 212 stores the created indexes in an index list 227 for each item of image data 222.

The extraction section 212 extracts operation log items having logging on as the "operation" from the system data 221, and creates indexes associating a "time" with an item "acquisition" of that operation log. Similarly, the extraction section 212 extracts operation logs having logging off as the "operation" from the system data 221, and creates indexes associating a "time" with an item "release" of that operation log. The extraction section 212 references the terminal image correspondence table 226A and identifies the image data 222 corresponding to the "terminal ID" of the operation log, and stores the indexes created from the system data 221 in the index list 227 of the identified image data 222.

FIG. 17 illustrates an example of index lists 227 pairing the indexes created from the image data 222 and the indexes created from the system data 221. In this manner, indexes of the items "acquisition" and "release" can be simply created using the system data 221 without performing image processing to recognize the image pattern.

The output section 214 extracts operation log item groups of logging on and logging off to and from each information processing terminal from the system data 221. Groups of operation log items of logging on and logging off are each a group of an operation log item of logging on and an operation log, appearing immediately after that operation log item, of logging off from the same information processing terminal by the same user. Moreover, the output section 214 identifies the time corresponding to logging on (referred to as the "log-on time" hereafter) and the time corresponding to logging off (referred to as the "log-off time" hereafter) included in the extracted group of operation log items. Then, the output section 214 references the terminal image correspondence table 226A and identifies the image data 222 corresponding to the "terminal ID" included in the extracted group of operation log items. The output section 214 extracts, from the index list 227 of the identified image data 222, indexes for which time information included in the index is included in a period spanning from the log-on time to the log-off time.

Similarly to the output section 114 of the first exemplary embodiment, the output section 214 uses the time information included in the extracted indexes to determine the calculation and condition of each definition item defined by the task definition DB 225. Moreover, the output section 214 extracts, from the system data 221, the user ID, operation, and time corresponding to each information processing terminal. Then, the output section 214 stores, in the comparison result list 229, a comparison result associating the terminal ID, the user ID, the log-in time and log-off time of each user, and the determination result of each definition item with one another. Note that the definition item associated with the determination result is a definition item stipulating a "condition", and no determination result is associated with the definition item of No. 1, which stipulates a "calculation method" alone. Accordingly, in the second exemplary embodiment, the determination result is associated with the definition item of No. 2 alone.

Moreover, the output section 214 displays an output screen including the stored comparison result list 229 on the display device. FIG. 18 illustrates an example of an output screen 230. The comparison result list 229, an outline display region 232, and a usage state listing display region 233 are included in the output screen 230.

When any comparison result (for example, the dashed portion of FIG. 18) is selected from the comparison result list 229, the output section 214 identifies a terminal ID, user ID, log-on time, and log-off time included in the selected comparison result. The output section 214 then displays the identified information in the outline display region 232. The output section 214 also references the terminal image correspondence table 226A and identifies the image data 222 corresponding to the identified terminal ID. The output section 214 extracts, from the index list 227 of the identified image data 222, indexes for which the time information included in the index is included in a period spanning from the identified log-on time to the log-off time. The output section 214 then lists and displays the extracted indexes in a usage state listing display region 233. Since indexes include items according to the task processes, the usage state of the information processing terminal can be ascertained by just displaying a listing of indexes.

The task circumstance processing device 200 may, for example, be implemented by the computer 40 illustrated in FIG. 7. A task circumstance processing program 250 for causing the computer 40 to function as the task circumstance processing device 200 is stored in the storage section 43 of the computer 40. The task circumstance processing program 250 includes an extraction process 252 and an output process 254. Moreover, the storage section 43 includes an information storage region 60 that stores information respectively forming the task definition DB 225, the recognition information DB 226, and the index list 227.

The CPU 41 reads the task circumstance processing program 250 from the storage section 43, expands the task circumstance processing program 250 into the memory 42, and sequentially executes the processes included in the task circumstance processing program 250. The CPU 41 operates as the extraction section 212 illustrated in FIG. 1 by executing the extraction process 252. The CPU 41 also operates as the output section 214 illustrated in FIG. 1 by executing the output process 254. The computer 40, which executes the task circumstance processing program 250, thereby functions as the task circumstance processing device 200.

Note that the functionality implemented by the task circumstance processing program 250 may, for example, be implemented by a semiconductor integrated circuit, and more specifically, by an ASIC or the like.

Figure 19:
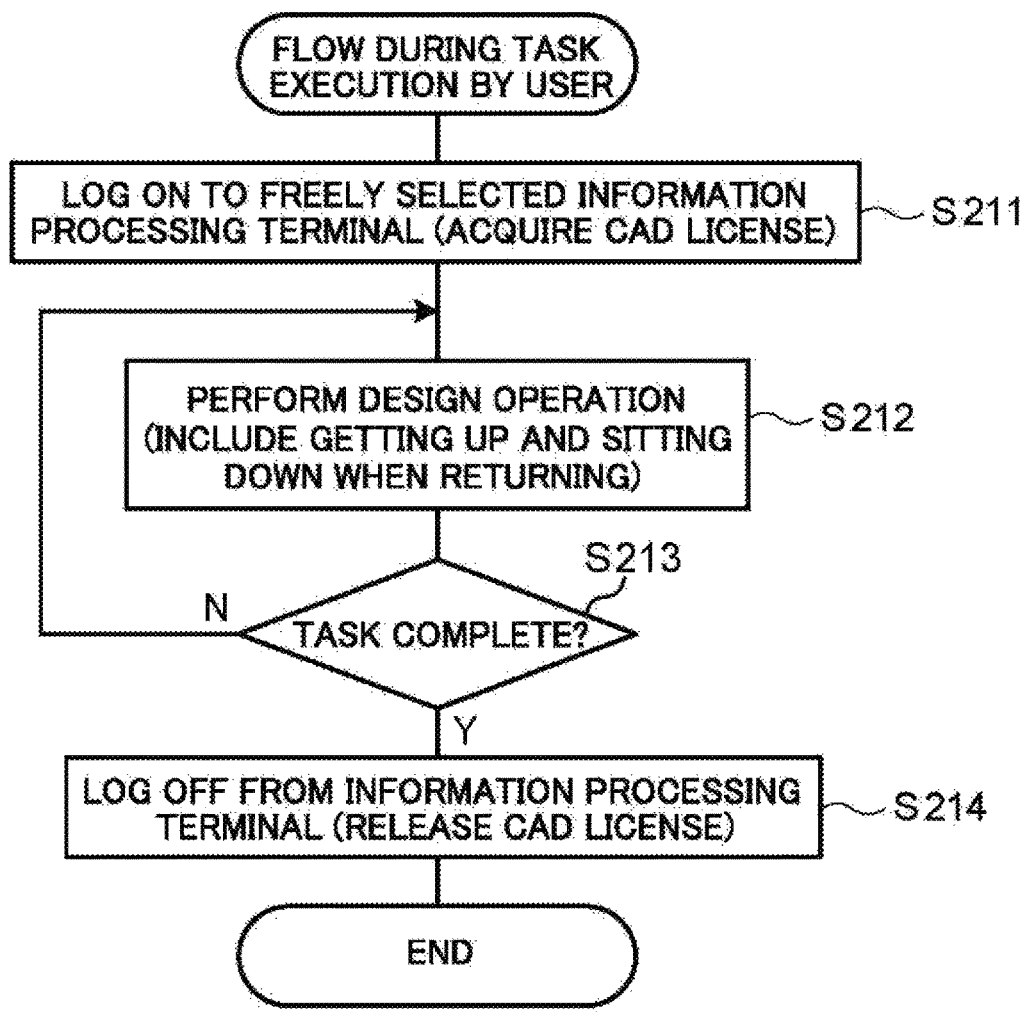
FIG. 19 is a flowchart flow illustrating an example of a procedure during task execution by a user of the second exemplary embodiment.

Next, explanation follows regarding operation of the task circumstance processing device 200 according to the second exemplary embodiment. In the second exemplary embodiment, prior to the task circumstance processing device 200 executing the task circumstance processing, the image data 222 is, for example, obtained as observation data by executing a task using the procedure indicating the flow during task execution by the user illustrated in FIG. 19. Detailed explanation follows regarding the flow during task execution by the user. Note that while the user is executing the task, the information processing terminal surroundings are always being captured by the video camera installed in a fixed position.

At step S211, the user logs on to the information processing terminal. Then, at the next step S212, the user performs a task such as using CAD in a design operation. The operation continues until the user determines that the task has ended at step S231. During this period the user gets up from the information processing terminal and then sits down again to resume the operation. When the task has ended, at step S214, the user logs off from the information processing terminal.

Thus, the operation logs of each information processing terminal are accumulated as system data 221, and the image data 222 captured by the each video camera is accumulated. Note that, similarly to in the first exemplary embodiment, the image data captured by each video camera is stored in a specific library. Then, in the task circumstance processing device 200, when analysis of the task circumstances is instructed, the task circumstance processing illustrated in FIG. 9 is executed in the task circumstance processing device 200. Detailed description follows regarding index creation processing, comparison processing, and comparison result output processing executed by in task circumstance processing of the second exemplary embodiment.

Figure 20:
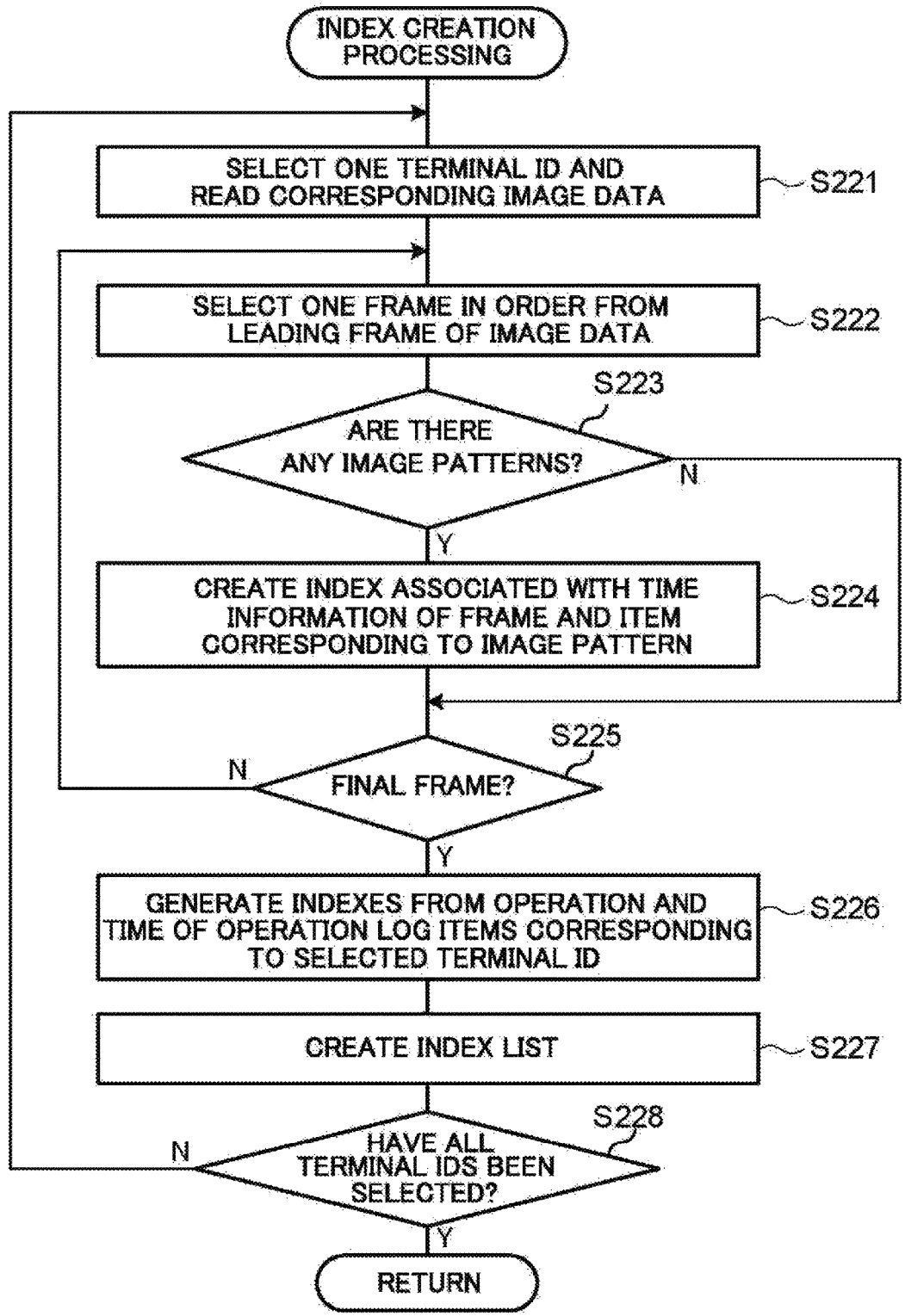
FIG. 20 is a flowchart illustrating an example of index creation processing of the second exemplary embodiment.

First, explanation follows regarding the index creation processing of the second exemplary embodiment, with reference to FIG. 20.

At step S221, the extraction section 212 selects one terminal ID, references the terminal image correspondence table 226A to identify the image data 222 corresponding to the selected terminal ID, and reads the identified image data 222 from the library.

Next, similarly to in steps S122 to S125 of the index creation processing of the first exemplary embodiment, at steps S222 to S225, indexes are created based on the image patterns.

Next, at step S226, the extraction section 212 extracts, from the system data 221, operations log items having log-on as the "operation" and creates indexes associating the "time" of the operation log item with the item "acquisition". Similarly, the extraction section 212 extracts, from the system data 221, operation log items having log-off as the "operation" and creates indexes associating the "time" of that operation log item with the item "release". The extraction section 212 pairs indexes created at step S224 above with indexes created at step S226 above, and creates the index list 227 of image data corresponding to the terminal ID selected at step S221 above.

Next, at step S228, the extraction section 212 determines whether or not all of the terminal IDs have been selected. Processing returns to step S221 in cases in which an unselected terminal ID is present, or in cases in which all of the terminal IDs have been selected, the index creation processing ends and processing returns to the task circumstance processing (FIG. 9).

Figure 21:
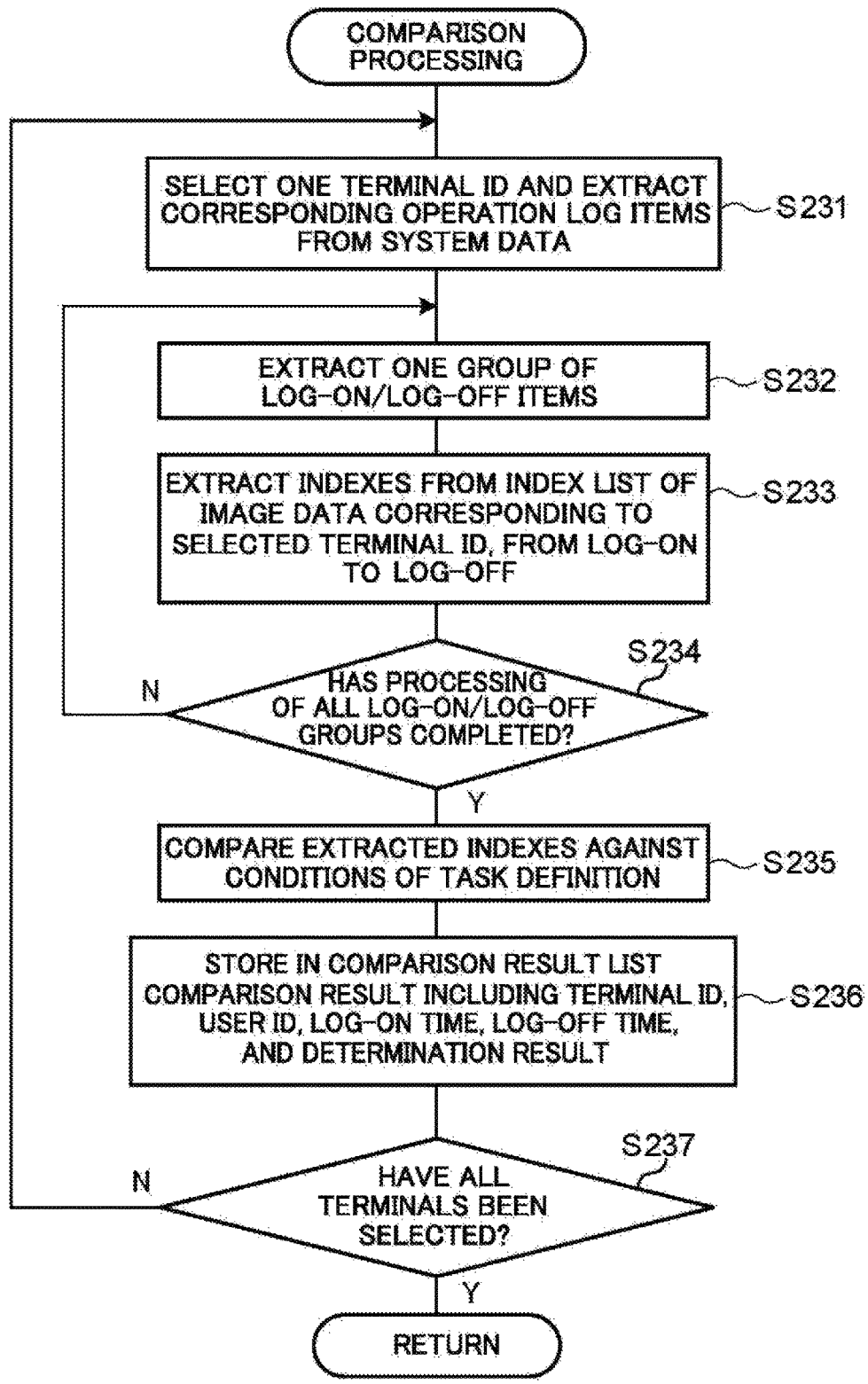
FIG. 21 is a flowchart illustrating an example of comparison processing of the second exemplary embodiment.

Next, explanation follows regarding comparison processing, with reference to FIG. 21.

At step S231, the output section 214 selects one terminal ID, and extracts, from the system data 221, operation log items having a "terminal ID" that matches the selected terminal ID.

Next, at step S232, the output section 214 extracts, from the operation log extracted at step S231 above, one group of operation log items of a log-on and a log-off.

Next, at step S233, the output section 214 references the terminal image correspondence table 226A and identifies the image data 222 corresponding to the terminal ID selected at step S231 above. The output section 214 then extracts, from the index list 227 of the identified image data 222, indexes for which time information included in the index is included in a period spanning from the log-on time to the log-off time of the group of operation log items extracted at step S232 above.

Next, at step S234, the output section 214 determines whether or not the processing to extract indexes has completed for the group of operation log items of a log-on and a log-off included in the operation log items extracted at step S231 above. Processing returns to step S232 in cases in which an unprocessed group of operation log items is present, or processing transitions to step S235 in cases in which processing has completed for all of the groups of operation log items.

At step S235, the output section 214 uses the time information included in all of the indexes extracted at step S234 above to determine the calculation and condition of each definition item defined in the task definition DB 225.

Next, at step S236, the output section 214 extracts, from the system data 221, the user ID, operation, and time included in the operation log items that include the terminal ID selected at step S231 above. The output section 214 then stores, in the comparison result list 229, the comparison result associated with the terminal ID, the user ID, the log-in time and log-off time of each user, and the determination result of each definition item.

Next, at step S237, the extraction section 212 determines whether or not all of the terminal IDs have been selected. Processing returns to step S231 in cases in which an unselected terminal ID is present, or in cases in which all of the terminal IDs have been selected, the comparison processing ends and processing returns to the task circumstance processing (FIG. 9).

Figure 22:
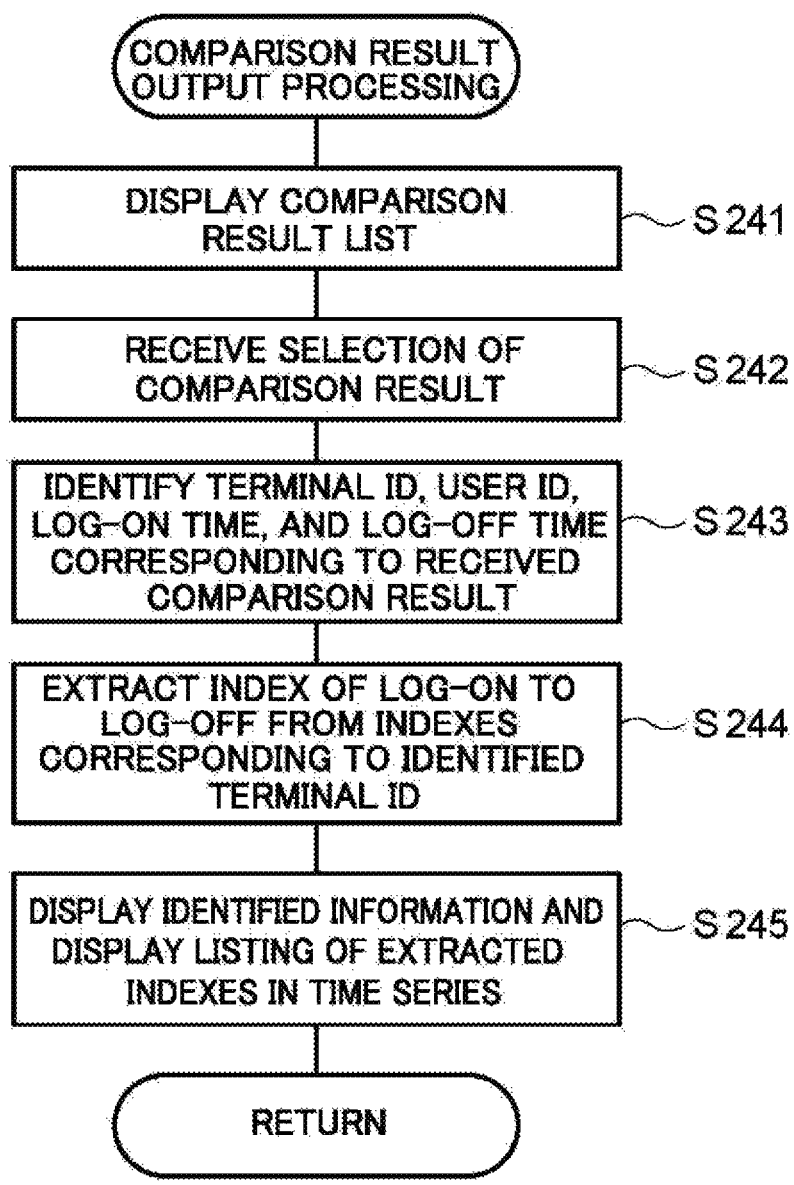
FIG. 22 is a flowchart illustrating an example of comparison result output processing of the second exemplary embodiment.

Next, explanation follows regarding comparison result output processing with reference to FIG. 22.

At step S241, the output section 214 displays the output screen that includes the stored comparison result list 229 on the display device. Next, at step S242, the output section 214 receives a selection of any comparison result.

Next, at step S243, the output section 214 identifies the terminal ID, the user ID, the log-on time, and the log-off time included in the selected comparison result.

Next, at step S244, the output section 214 references the terminal image correspondence table 226A and identifies the image data 222 corresponding to the identified terminal ID. The output section 214 then extracts, from the index list 227 of the identified image data 222, indexes for which time information included in the index is included in the identified period spanning from the log-on time to the log-off time.

Next, at step S245, the output section 214 displays the information identified at step S243 above in the outline display region 232. The output section 214 also lists and displays the indexes extracted at step S244 above in the usage state listing display region 233.

As explained above, the task circumstance processing device 200 according to the second exemplary embodiment also uses information obtained from the system data to append the indexes to the image data. Thus, in addition to the advantageous effects of the first exemplary embodiment, information useful for simple processing can also be created as indexes.

Figures 23, 24:
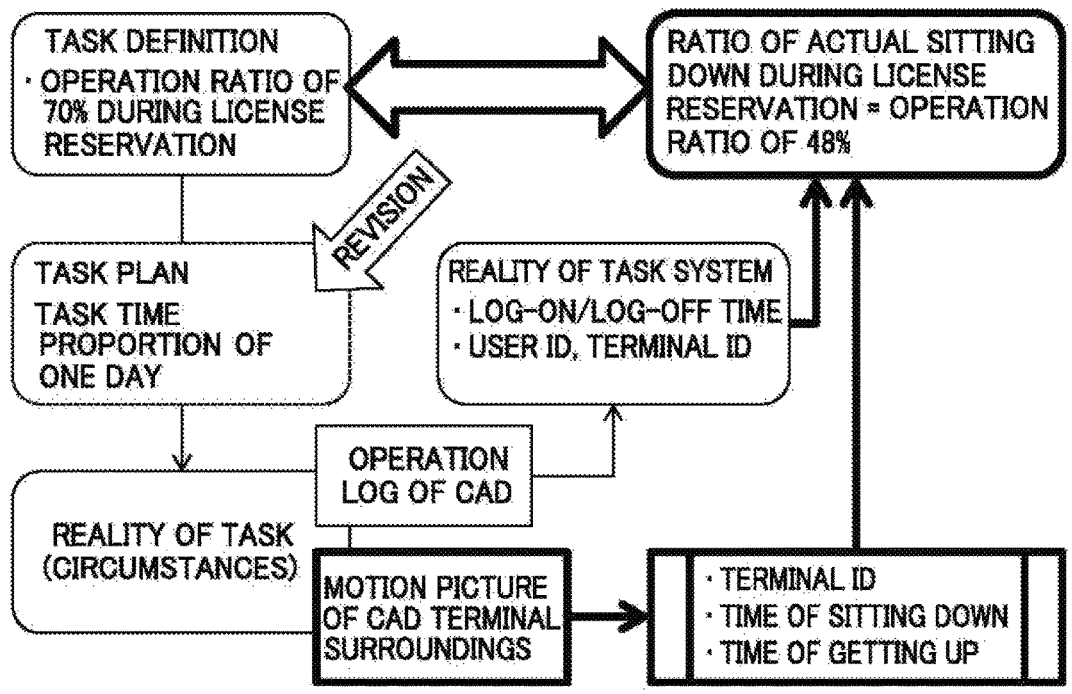
FIG. 23 is a schematic diagram illustrating an example of a comparison between circumstances of a task and task definitions of the second exemplary embodiment.
FIG. 24 is a diagram illustrating an example of system data of the third exemplary embodiment.

More specifically, FIG. 23 schematically illustrates an example of a comparison between a task circumstance and a task definition, in which CAD is employed as an example in the second exemplary embodiment. For example, from the comparison result list 229 of the output screen 230 illustrated in FIG. 18, when a "BAD" comparison result (the dashed portion in FIG. 18) of the determination result is selected, a usage state of the user indicated by that comparison result is displayed in the usage state listing display region 233. Based on the usage state, for example, investigations of improvement plans, such as revising a task time proportion in which the usage of CAD can be more concentrated can be performed.

Note that in the second exemplary embodiment, image data in which plural information processing terminals are included in the capture range of a video camera may be employed. In such cases, a region representing each information processing terminal can be defined on the image indicated by the image data, and a user sitting down at and getting up from each information processing terminal may be recognized from the region of each information processing terminal. Moreover, in such cases, the terminal IDs and identifying information regarding a region defined for each image may be associated with each other in the terminal image correspondence table 226A.

Third Exemplary Embodiment

In the third exemplary embodiment, explanation follows regarding an example of a case in which analysis is performed on circumstances of a production task, in particular, a production task that needs a preparation operation performed manually by an operator. Note that in the third exemplary embodiment, configuration similar to configuration of the first exemplary embodiment is allocated reference numerals that share the same final two digits, and explanation focuses on portions that differ from the first exemplary embodiment.

As illustrated in FIG. 1, a task circumstance processing device 300 according to the third exemplary embodiment compares task circumstances recognized from system data 321 and image data 322, against task definitions, and outputs a comparison result list 329.

The system data 321 of the third exemplary embodiment is log data indicating a running state of each production installation recorded by the task system. FIG. 24 illustrates an example of the system data 321 of the third exemplary embodiment. In the example of FIG. 24, each row (each record) is one running state log item. Each running state log item includes a time at which the installation started or stopped running, an installation ID that is identifying information of the target production installation, information indicating whether the running state is started or stopped, and the like.

Similarly to in the first exemplary embodiment, the image data 322 in the third exemplary embodiment is image data captured while the operator is performing an operation, by a video camera worn on a specific location (for example, the head) of the operator.

The task circumstance processing device 300 functionally includes an extraction section 312 and an output section 314. A task definition DB 325 and a recognition information DB 326 are stored in specific storage region of the task circumstance processing device 300.

The operator arriving and staying at the installation location of each production installation, and starting and stopping of running of each production installation, are included as task processes in the production task, in an example of the third exemplary embodiment. More specifically, as the flow of the task, the operator mans plural production installations, and when the operator arrives at a given production installation, the operator starts the running of the production installation after having performed a preparation operation at that production installation, and moves to another production installation. When a predetermined production process ends at a production installation where running has started, the running then stops. The task definitions of the task, for example, state that a permissible time from stopping the running of the production installation until the operator arrives is within 5 minutes.

In such cases, FIG. 25 illustrates an example of the task definition DB 325. In the example of FIG. 25, the task definitions include a definition item No. 1 that stipulates a calculation method for an operator waiting time and a condition determining whether or not the operator waiting time is less than 5 minutes. The operator waiting time is stipulated as the time from the production installation stopped until the operator arrives.

As illustrated in FIG. 26, an operator image correspondence table 326A, an image pattern recognition table 326C, and a recognition condition table 326D are included in the recognition information DB 326 of the third exemplary embodiment.

The operator image correspondence table 326A is a table indicating correspondence relationships indicating which video camera worn on an operator captured each item of the image data 322. In the example of FIG. 26, the operator ID, which is identification information of the operator, and an image ID, which is identification information of the image data 322, are associated with each other and registered.

The image pattern recognition table 326C is similar to the recognition information DB 126 of the first exemplary embodiment, and stores a different image pattern for each production installation. The image patterns are captured by the video camera worn by the operator when the operator has arrived at each production installation. However, the image pattern may also be inadvertently captured while the operator is performing a preparation operation at the production installation. Namely, since execution of a task process is not recognizable from the extracted image pattern alone, installation IDs, associated with image patterns, of the production installation indicated by the recognized image pattern are associated as a recognition result candidate in the image pattern recognition table 326C.

The recognition condition table 326D is a table determining conditions for determining whether the recognition result candidate recognized by each image pattern is "arrival" or "staying". More specifically, configuration is made such that the recognition result is determined as "arrival" in cases in which the image pattern extracted immediately previously and the image pattern extracted the current time are different, and the recognition result is determined as "staying" when the image pattern extracted immediately previously and the image pattern extracted the current time are the same.

Similarly to the extraction section 112 of the first exemplary embodiment, the extraction section 312 extracts each image pattern stored in the image pattern recognition table 326C from each frame of the input image data 322 by image processing such as pattern matching. The extraction section 312 then obtains the recognition result candidate indicating the installation ID. The extraction section 312 also determines that the recognition result is "arrival" or "staying" according to the recognition condition table 326D. Namely, the recognition result is established in accordance with the installation ID obtained as the recognition result candidate. For example, in cases in which the recognition result candidate is "10" and "arrival" is determined in accordance with the recognition condition table 326D, the recognition result is established as "arrival at production installation having installation ID=10". The extraction section 312 creates an index that associates the time information of the frame from which any image pattern was extracted, with the established recognition result. The extraction section 312 stores the created index in the index list 327 for each item of the image data 322. FIG. 27 illustrates an example of the index lists 327. In the example of FIG. 27, installation IDs and items indicating arrival or staying are associated with the time information of the frames.

The output section 314 extracts groups of running state log items of stopping and starting each production installation from the system data 321. The group of running state log items of stopping and starting is group of a running state log item of stopping and a running state log item of starting of the same production installation appearing immediately after that running state log item. The output section 314 also identifies a time corresponding to stopping included in the extracted group of running state log items (referred to as the "stop time" hereafter) and a time corresponding to the starting (referred to as the "start time" hereafter). The output section 314 then extracts indexes that include the installation ID of the target production installation from the index lists 327 of all of the image data 322. The output section 314 also narrows the indexes down to the indexes for which the time information included in the extracted index is included in a period spanning from the stop time to the start time.

The output section 314 then extracts indexes having arrival as the "item" from out of the narrowed down indexes, the time information of these indexes is employed as the Time (arrival) defined in the task definition DB 325. The output section 314 also employs the "time" of the running state log item of stopping included in the group of running state log items of stopping and starting as the Time (stop) defined in the task definition DB 325. Then, the determination of the calculation and the condition of the definition items defined in the task definition DB 325 are performed.

The output section 314 identifies whether indexes that include time information employed as the Time (arrival) were extracted from the index lists 327 of any image data 322. The output section 314 then references the operator image correspondence table 326A and identifies the operator ID corresponding to the identified image data 322.

The output section 314 stores comparison results associated with the installation ID, the Time (arrival), the identified operator ID, and the determination result of the definition item in, for example, a comparison result list 329 like that illustrated in FIG. 28.

The output section 314 also displays an output screen including the information of the stored comparison result list 329 on the display device. FIG. 29 illustrates an example of an output screen 330. An installation designation article 334 capable of designating a production installation using a pull-down menu or the like, an installation state display region 335, an operator state display region 333, and an image playback region 331 are included in the output screen 330.

When the production installation is designated by the installation designation article 334, the output section 314 extracts, from the system data 321, times and running states of running state log items that include the installation ID of the designated production installation. The output section 314 also extracts the time and item of the indexes that include the designated installation ID from the index lists 327 of all of the image data 322. The output section 314 then arranges the extracted times and running states or items into a time series, and displays this in the installation state display region 335. The "state" of the installation state display region 335 illustrated in FIG. 29 is the running state extracted from the system data 321, or the item of the index. Moreover, in cases in which the "state" is "arrival", the output section 314 extracts, from the comparison result list 329, the determination result of the operator ID and the definition item, and displays the extracted determination result on the installation state display region 335, using the "time" of that row as a key.

When any operator ID (for example, the dashed portion of FIG. 29) is selected from the installation state display region 335, the output section 314 references the operator image correspondence table 326A and identifies the image data 322 corresponding to the selected operator ID. The output section 314 then displays the index list 327 of the identified image data 322 on the operator state display region 333 in association with the selected operator ID. Moreover, the output section 314 emphatically displays the index corresponding to the row of the operator state display region 333 selected by the operator ID in the installation state display region 335. Emphatic display is represented by the shading in the operator state display region 333 illustrated in FIG. 29.

Moreover, the output section 314 plays back, on the image playback region 331, the image data 322 identified for displaying the operator state display region 333 from the place (frame) indicated by the time information included in the index corresponding to the emphatically displayed index. The index corresponding to the emphatically displayed index may, for example, be the index one row prior to the emphatically displayed index. Since the emphatically displayed index indicates "arrival", when arrival at a given production installation is late, the operation state prior to this can be considered the cause of the lateness. Thus, confirmation of operation states that have a high probability of having problems is simplified by playing back from the frame indicated by the time information of the index that includes the time information prior to the emphatically displayed index.

The task circumstance processing device 300 may, for example, be implemented by the computer 40 illustrated in FIG. 7. A task circumstance processing program 350 for causing the computer 40 to function as the task circumstance processing device 300 is stored in the storage section 43 of the computer 40. The task circumstance processing program 350 includes an extraction process 352 and an output process 354. Moreover, the storage section 43 includes an information storage region 60 that stores information respectively forming the task definition DB 325, the recognition information DB 326, and the index list 327.

The CPU 41 reads the task circumstance processing program 350 from the storage section 43, expands the task circumstance processing program 350 into the memory 42, and sequentially executes the processes included in the task circumstance processing program 350. The CPU 41 operates as the extraction section 312 illustrated in FIG. 1 by executing the extraction process 352. The CPU 41 also operates as the output section 314 illustrated in FIG. 1 by executing the output process 354. The computer 40, which executes the task circumstance processing program 350, thereby functions as the task circumstance processing device 300.

Note that the functionality implemented by the task circumstance processing program 350 may, for example, be implemented by a semiconductor integrated circuit, and more specifically, by an ASIC or the like.

Figure 30:
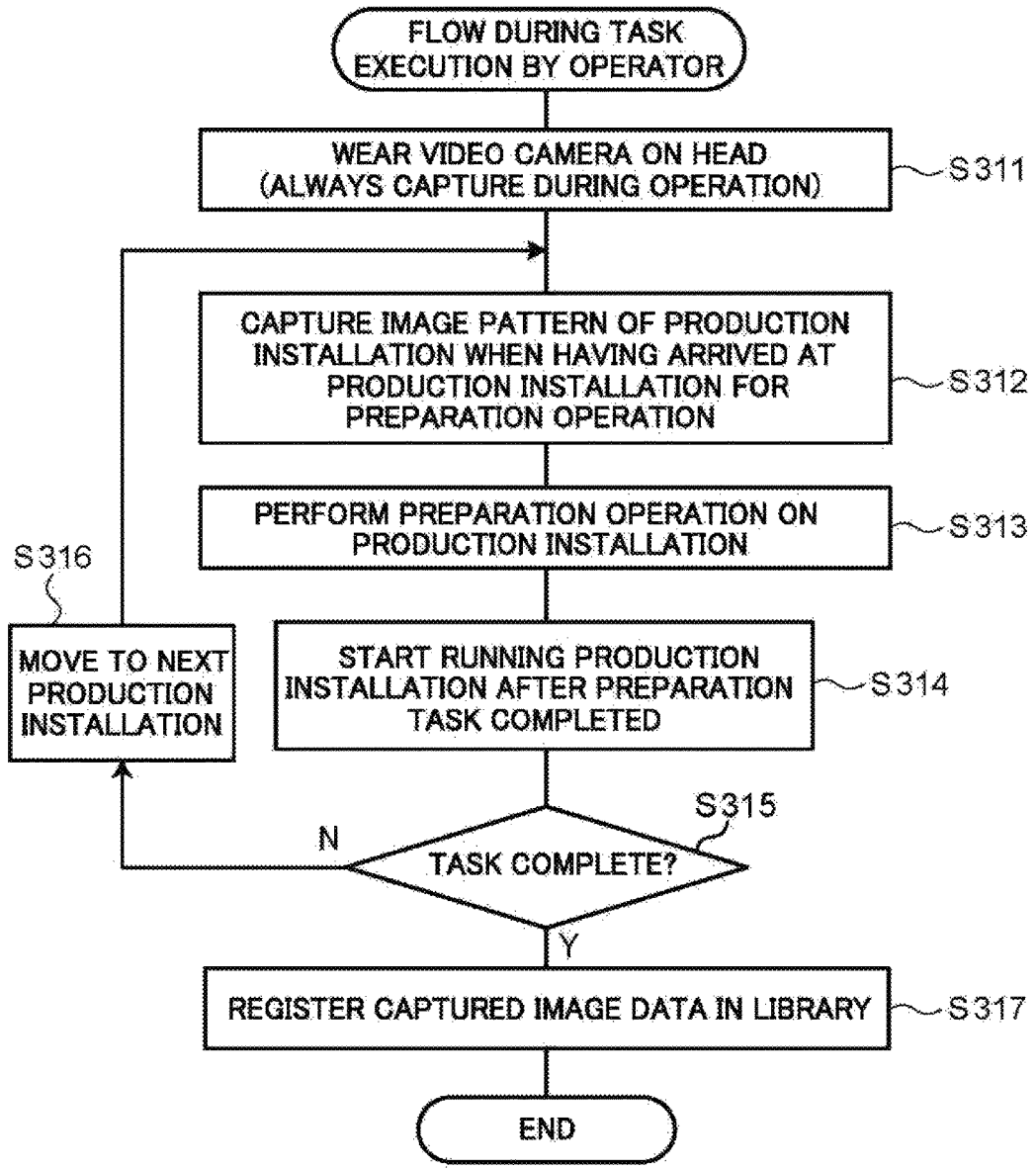
FIG. 30 is a flowchart flow illustrating an example of a procedure during task execution by an operator of the third exemplary embodiment.

Next, explanation follows regarding operation of the task circumstance processing device 300 according to the third exemplary embodiment. In the third exemplary embodiment, prior to the task circumstance processing being executed by the task circumstance processing device 300, for example, due to the task executing, the image data 322 is obtained as the observation data by the procedure illustrated in the flow of task execution by the operator illustrated in FIG. 30. Detailed explanation follows regarding the flow of task execution by the operator.

At step S311, the operator wears the video camera on a specific location (for example, the head) of their own body such that the state of the preparation operation by the operator is included in the image capture range, and starts image capture. Image capture by the video camera continues until the production task ends.

Next, at step S312, the operator moves to any of the production installations manned by the operator himself, and when having arrived at the installation location of the production installation, images an image pattern, affixed to the production installation, for identifying that production installation. Then, at step S313, the operator performs the preparation operation in the production installation whose image pattern was imaged at step S312 above. Next, at step S314, the operator starts running the production installation for which the preparation operation has finished.

Next, at step S315, the operator determines whether or not the production task has completed. In cases in which the production task has not completed, at step S316, the operator moves to the next installation and repeats the preparation operation. Namely, the procedure of steps S312 to S314 is repeated. In cases in which the production task has completed, at the next step S317, the image data 322 captured by the video camera is registered in a specific library, and the production task ends.

Thus, the image data 322 is accumulated in the library by the operator executing the production task. Moreover, the system data 321 indicating the running state of each production installation is also accumulated. Then, in the task circumstance processing device 300, when analysis of the task circumstance is instructed, the task circumstance processing illustrated in FIG. 9 is executed in the task circumstance processing device 300. Detailed description follows regarding index creation processing, comparison processing, and comparison result output processing executed by in task circumstance processing of the third exemplary embodiment.

Figure 31:
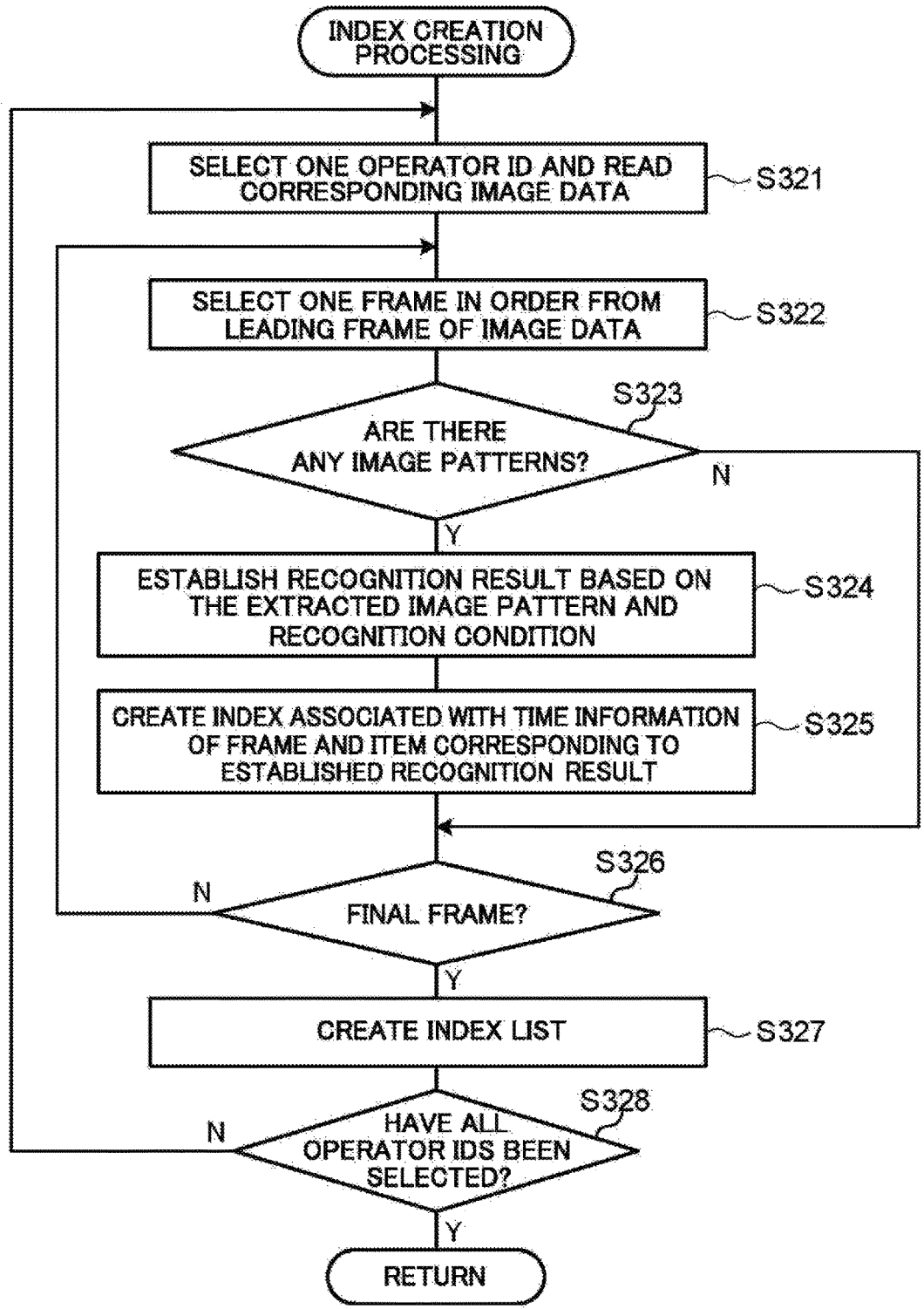
FIG. 31 is a flowchart illustrating an example of index creation processing of the third exemplary embodiment.

First, explanation follows regarding the index creation processing of the third exemplary embodiment, with reference to FIG. 31.

At step S321, the extraction section 312 selects one operator ID, references the operator image correspondence table 326A, identifies the image data 322 corresponding to the selected operator ID, and reads the identified image data 322 from the library.

Next, at steps S322 and S323, similarly to at steps S222 and S223 of the index creation processing of the second exemplary embodiment, determination is made as to whether or not any image patterns to be stored in the image pattern recognition table 326C are included in the selected frames. Processing transitions to step S324 in cases in which an image pattern is included, or processing transitions to step S326 in cases in which no image patterns are included.

At step S324, the extraction section 312 acquires the recognition result candidate indicating the installation ID corresponding to the extracted image pattern. The extraction section 312 then determines whether the recognition result is "arrival" or "staying" in accordance with the recognition condition table 326D, and establishes the recognition result in accordance with the installation ID obtained as the recognition result candidate.

Next, at step S325, the extraction section 312 creates an index that associates the time information of the frames from which any image patterns were extracted, with the established recognition result.

Next, at step S326, similarly to at step S225 of the index creation processing of the second exemplary embodiment, the extraction section 312 determines whether or not the selected frame is the final frame, processing transitions to step S327 in cases in which the frame is the final frame.

At step S327, the extraction section 312 stores the created indexes in the index list 327 for each image data 322.

Next, at step S328, the extraction section 312 determines whether or not all of the operator IDs have been selected. Processing returns to step S321 in cases in which an unselected operator ID is present, or in cases in which all of the operator IDs have been selected, the index creation processing ends and processing returns to the task circumstance processing (FIG. 9).

Figure 32:
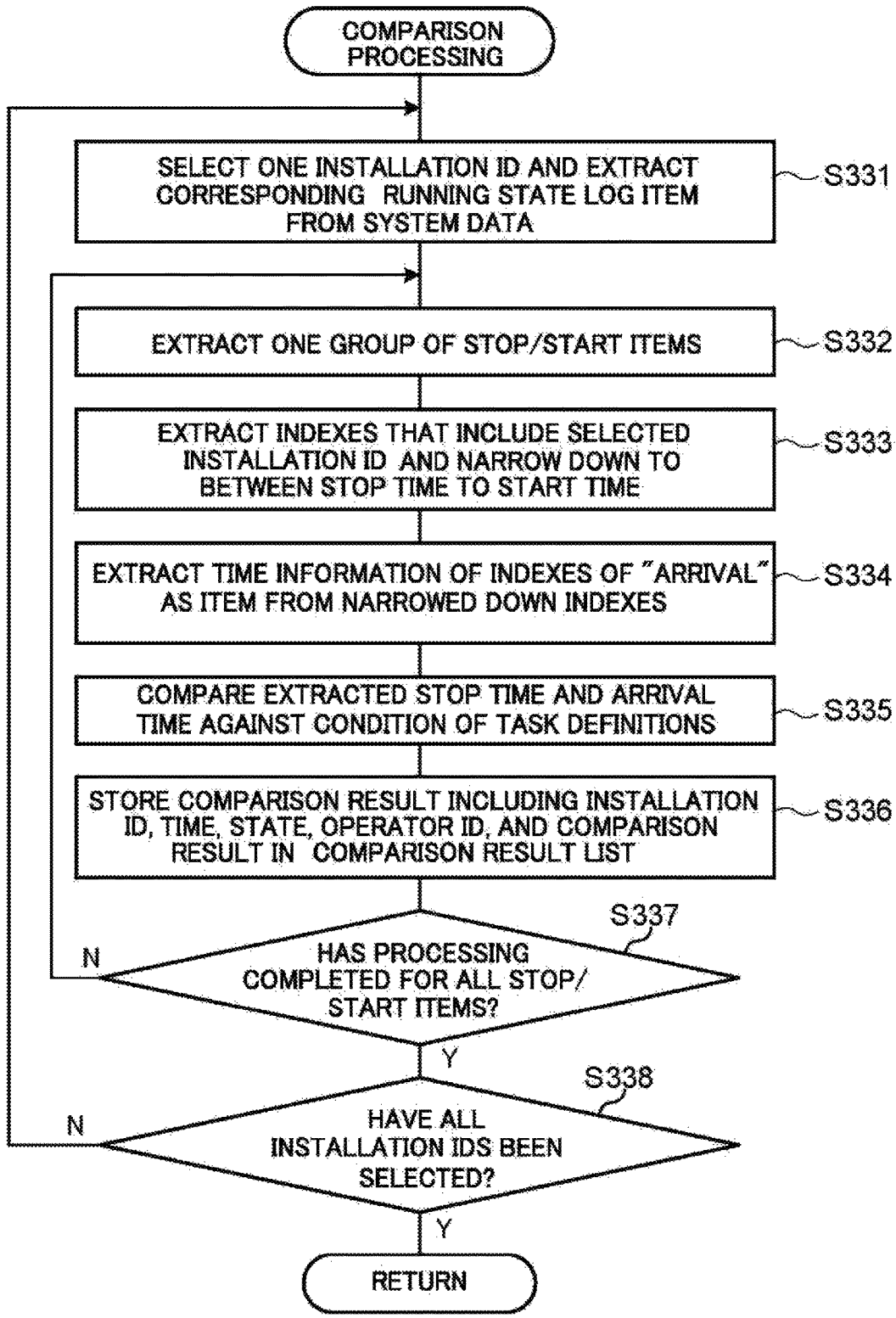
FIG. 32 is a flowchart illustrating an example of comparison processing of the third exemplary embodiment.

Next, explanation follows regarding the comparison processing with reference to FIG. 32.

At step S331, the output section 314 selects one installation ID, and extracts, from the system data 321, running state log items for which the "installation ID" matches the installation ID selected.

Next, at step S332, the output section 314 extracts, from the running state log items extracted at step S331 above, one group of running state log items of stopping and starting.

Next, at step S333, the output section 314 identifies the stop time and the start time included in the group of running state log items extracted at step S332 above. The output section 314 then extracts, from the index lists 327 of all of the image data 322, indexes that include the installation ID selected at step S331 above. The output section 314 then narrows down the indexes to indexes for which the time information included in the extracted index is included in a period spanning from the stop time to the start time identified in the current step.

Next, at step S334, the output section 314 extracts, from amongst the indexes narrowed down at step S333 above, indexes having arrival as the "item". Next, at step S335, the time information of the indexes extracted at step S334 above, and the "time" of the running state log item of stopping extracted at step S332 above are employed to perform the determination of the calculation and condition of the definition item defined in the task definition DB 325.

Next, at step S336, the output section 314 references the operator image correspondence table 326A and identifies the operator ID corresponding to the index that includes the time information employed as the Time (arrival). The output section 314 then stores, in the comparison result list 329, a comparison result associated with the installation ID selected at step S331 above, the Time (arrival), the identified operator ID, and the determination result of the definition item.

Next, at step S337, the output section 314 determines whether or not the processing to extract indexes has completed for the group of operation log items of starting and stopping included in the running state log items extracted at step S331 above. Processing returns to step S332 in cases in which an unprocessed group of running state log items is present, or processing transitions to step S338 in cases in which processing has completed for all of the groups of running state log items.

At step S338, the extraction section 312 determines whether or not all of the installation IDs have been selected. Processing returns to step S331 in cases in which an unselected installation ID is present, or in cases in which all of the installation IDs have been selected, the comparison processing ends and processing returns to the task circumstance processing (FIG. 9).

Figure 33:
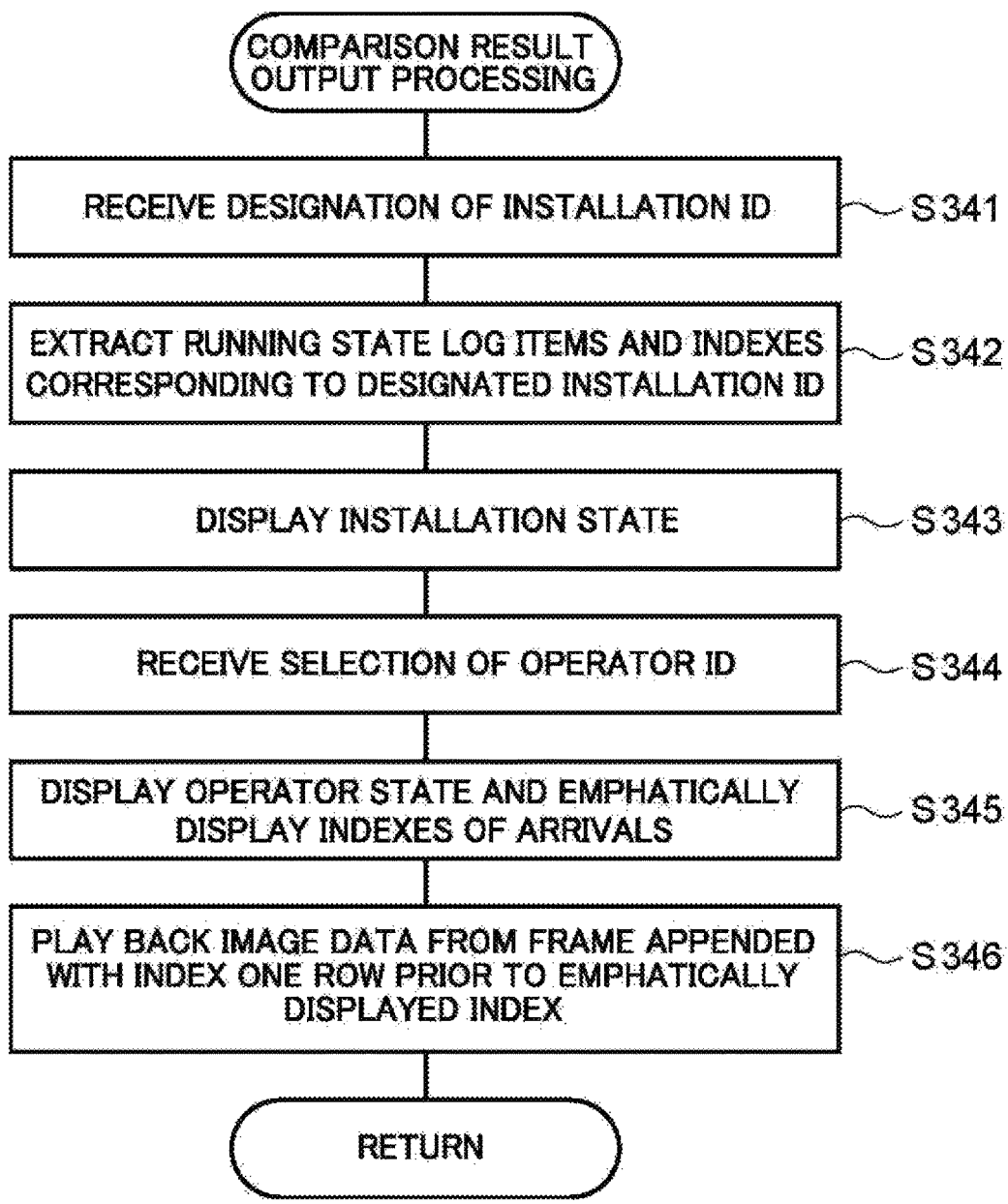
FIG. 33 is a flowchart illustrating an example of comparison result output processing of the third exemplary embodiment.

Next, explanation follows regarding the comparison result output processing, with reference to FIG. 33.

At step S341, the output section 314 displays the installation designation article 334 of the output screen 330, and receives designation of the installation ID.

Next, at step S342, the output section 314 extracts, from the system data 321, the time and running state of the running state log items that include the designated installation ID. The output section 314 also extracts, from the index lists 327 of all of the image data 322, the time and item of the indexes that include the designated installation ID.

Next, at step S343, the output section 314 orders the times and running states or items extracted at step S342 above in a time series, and displays the ordered times and running states or items in the installation state display region 335. In cases in which the "state" is "arrival", the output section 314 also extracts the determination result of the operator ID and the definition item from the comparison result list 329 using the time of that row as a key, and displays extracted determination result in the installation state display region 335.

Next, at step S344, the output section 314 receives any operator ID (for example, the dashed portion of FIG. 29) selected from the installation state display region 335. Next, at step S345, the output section 314 references the operator image correspondence table 326A and identifies the image data 322 corresponding to the selected operator ID. The output section 314 then displays the index list 327 of the identified image data 322 on the operator state display region 333 in association with the selected operator ID. Moreover, the output section 314 emphatically displays the index corresponding to the row of the operator state display region 333 selected by the operator ID in the installation state display region 335.

Next, at step S346, the output section 314 plays back, on the image playback region 331, the image data 322 identified for displaying the operator state display region 333 from the place (frame) indicated by the time information included in the index corresponding to the emphatically displayed index.

As explained above, the task circumstance processing device 300 according to the third exemplary embodiment, can determine the condition defined by the task definitions in accordance with the group of the information obtained from the system data and the index of the image data. Thus, in addition to the advantageous effects of the first exemplary embodiment, various conditions can be defined in the task definitions.

Figure 34:
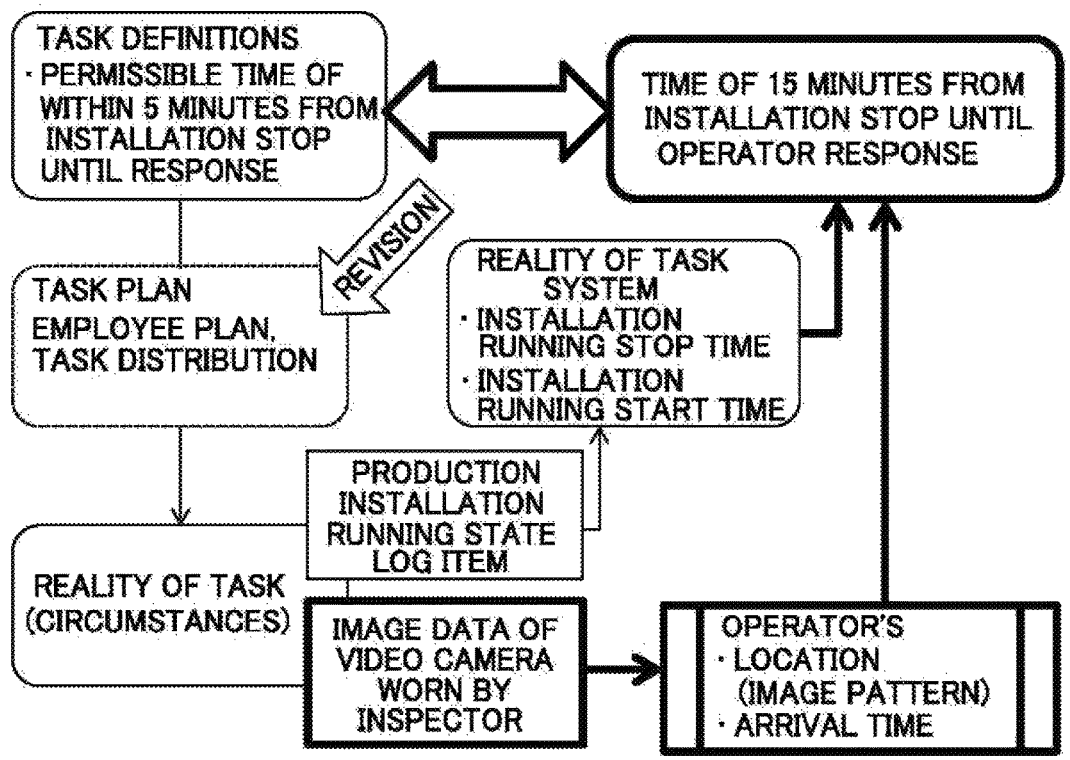
FIG. 34 is a schematic diagram illustrating an example of a comparison between circumstances of a task and task definitions of the third exemplary embodiment.

More specifically, FIG. 34 schematically illustrates an example of a comparison between the circumstance of production task and task definitions, as an example of the third exemplary embodiment. For example, the running state of the installation and the operation state of the operator can be confirmed by the output screen 330, like that illustrated in FIG. 29. Thus, whether there is a problem with the operation method itself, whether there is a problem with worker distribution or operation distribution, such as the number of production installations manned by the operator, and the like can be ascertained, and a review of task planning can be assisted.

In each of the exemplary embodiments above, indexes indicating that task processes were executed are created from observation data such as image data, and task analysis is also simplified when modifying task definitions in a method for using the indexes to determine the condition defined by the task definitions.

More specifically, new definition items are added to the task definition, and recognition information, such as an image pattern for creating the indexes employed in the calculation method or condition stipulated by the definition item, is newly added to the recognition information DB. In such cases, indexes related to newly added image patterns may be created from image data stored in the library, without re-capturing the task circumstance with the video camera. For example, in the first exemplary embodiment, at step S123 of the index creation processing, in cases in which whether or not the added image pattern is included in each frame is determined alone and the image pattern is included, a new index is created and the new index may be added to an already created index list. Then, the comparison processing illustrated in FIG. 11 may be executed based on the new task definitions that include the added definition item.

Moreover, in cases in which a new definition item that employed an image pattern already stored in the recognition information DB has been added to the task definitions, the already created index list may be employed, and the comparison processing illustrated in FIG. 11 may be executed based on the new task definitions that include the added definition item.

Although explanation has been given regarding cases in which the image data is employed as the observation data in each of the exemplary embodiments above, there is no limitation thereto. For example, voice data that is a collection of sounds from the operation site or audio data that is a recording of a voice during a telephone conversation may be employed as the observation data. In such cases, speaking a predetermined word such as "OK", or a predetermined sound such as a buzzer, may be stored in the recognition information DB as the pattern indicating that the task has been executed.

Moreover, a sensor value observed by a thermometer installed in at, for example, the operation site, or a sensor such as a hygrometer may be employed as the observation data. In such cases, a predetermined threshold value or time series changes or the like in the sensor value may be stored in the recognition information DB as a pattern indicating that the task has been executed. Moreover, instead of an image pattern affixed to the installation like in the explanation of each exemplary embodiment above, execution of task processes may be recognized based on information emitted from an emitter such as a beacon.

Moreover, task processes recognized from observation data is not limited to the examples of each exemplary embodiment above. For example, configuration may be made to recognize an action of extending the hand to a specific position (placing an item), an action such as pointing and confirming, passing a target object, increase or decrease of a target object, a change in a display object such as a PATLITE (registered trademark), or the like.

In each exemplary embodiment above, explanation has been given regarding cases in which the result of comparing task circumstance and the task definitions is displayed on a display device; however, output results are not limited to being displayed. For example, printing output, storage to a storage medium, or output to an external device may be performed.

Figure 35:
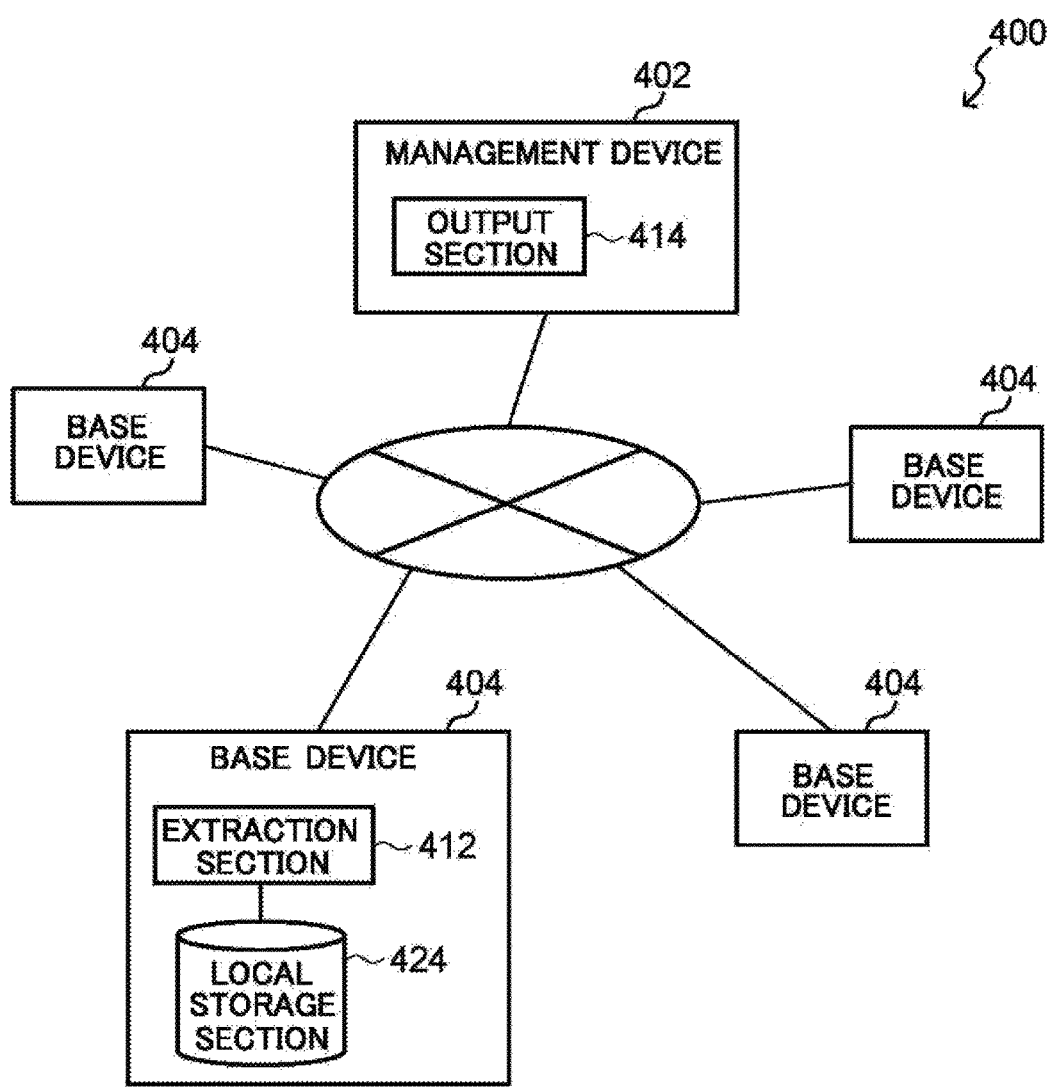
FIG. 35 is a functional block diagram illustrating a schematic configuration of a task circumstance processing system.

Moreover, although explanation has been given in each exemplary embodiment above regarding cases in which the extraction section and the output section are implemented by one computer, there is no limitation thereto. For example, as illustrated in FIG. 35, configuration may be made using a task circumstance processing system 400 including plural base devices that each include an extraction section 412 and a management device 402 that includes an output section 414. In such cases, observation data such as image data may be stored in a local storage section connected to each base device 404, and an index list created by the extraction section 412 may be transmitted to the management device 402. Network loads can be reduced between the management device 402 and each base device 404 by transmitting only a needed portion of image data having a large data size and the like. Moreover, even in cases in which the communication cost is high, such as in cases in which the base device is disposed overseas, the data amount transmitted to the management device 402 is suppressed, reducing the communication cost.

As in each exemplary embodiment above, in the comparison with the task definitions, circumstances of task actually occurring can be ascertained by analyzing the task circumstances, and deviation from the task definitions can be prevented. Moreover, understanding and acceptance by site operators toward proposals for improvement plans and the like is facilitated since task circumstances can be accurately ascertained. Moreover, in cases in which there are problems with the circumstances of the task, autonomous improvements to the task can be more easily proposed at the operation site since the operation states related to the cause can be ascertained. Moreover, task circumstances in which differences from the task definitions arise can be confirmed, and cases in which a method in which the task circumstances are more favorable than in the task definitions or the like can be ascertained, and this enables a review of the task definitions to be assisted.

Although explanation has been given above regarding a mode in which the task circumstance processing program 150, 250, 350 is pre-stored (installed) in the storage section 43, the task circumstance processing program 150, 250, 350 may also be provided in a mode recorded to a storage medium such as a CD-ROM or DVD-ROM.

The related technology merely analyzes circumstances of a business process, such as whether or not an employee is in their assigned region and the number of customers in each location, based on the segmented video recording.

According to technology disclosed herein, analysis of task circumstances in comparison with task definitions can be assisted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A task circumstance processing system comprising:
a memory that is configured to store task definitions that specify one or more conditions to be satisfied in a relationship between a plurality of task processes included in a task and, for each of the plurality of task processes, a recognition information that includes a pattern for recognizing execution of each of the plurality of task processes from observation data, the observation data including at least one of an image data, an audio data, and a sensor data, the image data including a captured image of the execution of the task process, the audio data including a sound associated with the execution of the task process, and the sensor data being generated by a sensor installed at an execution location; and
a processor coupled to the memory, and configured to:
recognize, for each of the task processes, a timing where the pattern included in the recognition information is expressed in the observation data;
identify the relationship between the plurality of task processes that have been executed based on the recognized timings,
determine whether or not the task that has been observed in the observation data is performed according to the task definitions by determining whether or not the identified relationship satisfies the one or more conditions to be satisfied among the plurality of task processes defined by the task definitions stored in the memory; and
output the determination result.

2. The task circumstance processing system of claim 1, wherein the recognition information is included in log information recorded by a task system employed in the execution of the plurality of task processes.

3. The task circumstance processing system of claim 1, wherein
in cases in which a relationship between new task processes has been added to the task definitions, and the recognition information of a new task process has been added to the memory,
the timing is recognized where the recognition information of the new task process is expressed in the observation data, and
the relationship is identified between the plurality of executed task processes that include the timing where the recognition information of the recognized new task process is expressed.

4. The task circumstance processing system of claim 1, wherein, when recognizing the timing where the recognition information for each of the task processes is expressed, an index associated with the task process is appended to the timing in the observation data where the recognition information of each of the task processes is expressed.

5. The task circumstance processing system of claim 4, wherein the index includes a date and a time of when the task process was executed, identification information of an observation target object, identification information of a location where observation was performed, and at least one type of observation data.

6. The task circumstance processing system of claim 1, wherein, as the determination result, a portion is output where there is a difference between the relationship between the plurality of executed task processes and the relationship between the plurality of task processes defined by the task definitions.

7. The task circumstance processing system of claim 6, wherein, when outputting the determination result, observation data is output corresponding to the portion having a difference.

8. The task circumstance processing system of claim 6, wherein:
when recognizing the timing where the recognition information for each of the task processes is expressed, an index for identifying the task process is appended to the timing in the observation data where the recognition information for each of the task processes is expressed; and
when outputting the determination result, a listing is output of indexes appended to the observation data corresponding to any of the portions having a difference.

9. A task circumstance processing method comprising:
storing, in a memory, task definitions that specify one or more conditions to be satisfied in a relationship between a plurality of task processes included in a task and, for each of the plurality of task processes, a recognition information that includes a pattern for recognizing execution of each of the plurality of task processes from observation data, the observation data including at least one of an image data, an audio data, and a sensor data, the image data including a captured image of the execution of the task process, the audio data including a sound associated with the execution of the task process, and the sensor data being generated by a sensor installed at an execution location;
recognizing, by a processor, for each of the task processes, a timing where the pattern included in the recognition information is expressed in the observation data;
identifying, by the processor, a relationship between the plurality of task processes that have been executed based on the recognized timings;
determining, by the processor, whether or not the task that has been observed in the observation data is performed according to the task definitions by determining whether or not the identified relationship satisfies the one or more conditions to be satisfied among the plurality of task processes defined by the task definitions stored in the memory; and
outputting the determination result.

10. The task circumstance processing method of claim 9, wherein the recognition information is included in log information recorded by a task system employed in the execution of the plurality of task processes.

11. The task circumstance processing method of claim 9, wherein
in cases in which a relationship between new task processes has been added to the task definitions, and the recognition information of a new task process has been added to the memory,
the timing is recognized where the recognition information of the new task process is expressed in the observation data, and
the relationship is identified between the plurality of executed task processes that include the timing where the recognition information of the recognized new task process is expressed.

12. The task circumstance processing method of claim 9, wherein, when recognizing the timing where the recognition information for each of the task processes is expressed, an index associated with the task process is appended to the timing in the observation data where the recognition information of each of the task processes is expressed.

13. The task circumstance processing method of claim 9, wherein, as the determination result, a portion is output where there is a difference between the relationship between the plurality of executed task processes and the relationship between the plurality of task processes defined by the task definitions.

14. The task circumstance processing method of claim 13, wherein, when outputting the determination result, observation data is output corresponding to the portion having a difference.

15. The task circumstance processing method of claim 13, wherein:
when recognizing the timing where the recognition information for each of the task processes is expressed, an index for identifying the task process is appended to the timing in the observation data where the recognition information for each of the task processes is expressed; and
when outputting the determination result, a listing is output of indexes appended to the observation data corresponding to any of the portions having a difference.

16. A non-transitory recording medium storing a task circumstance processing program that causes a computer to execute a process, the process comprising:
storing, in a memory, task definitions that specify one or more conditions to be satisfied in a relationship between a plurality of task processes included in a task and, for each of the plurality of task processes, a recognition information that includes a pattern for recognizing execution of each of the plurality of task processes from observation data, the observation data including at least one of an image data, an audio data, and a sensor data, the image data including a captured image of the execution of the task process, the audio data including a sound associated with the execution of the task process, and the sensor data being generated by a sensor installed at an execution location;
recognizing, for each of the task processes, a timing where the pattern included in the recognition information is expressed in the observation data;
identifying a relationship between the plurality of task processes that have been executed based on the recognized timings;
determining whether or not the task that has been observed in the observation data is performed according to the task definitions by determining whether or not the identified relationship satisfies the one or more conditions to be satisfied among the plurality of task processes defined by the task definitions stored in the memory; and outputting the determination result.

17. The non-transitory recording medium of claim 16, wherein, in the process, the recognition information is included in log information recorded by a task system employed in the execution of the plurality of task processes.

18. The non-transitory recording medium of claim 16, wherein, in the process, in cases in which a relationship between new task processes has been added to the task definitions, and the recognition information of a new task process has been added to the memory, the timing is recognized where the recognition information of the new task process is expressed in the observation data, and the relationship is identified between the plurality of executed task processes that include the timing where the recognition information of the recognized new task process is expressed.

* * * * *